(12) United States Patent
Nagai et al.

(10) Patent No.: US 12,388,332 B2
(45) Date of Patent: Aug. 12, 2025

(54) ELECTRIC PUMP

(71) Applicant: NIDEC TOSOK CORPORATION, Kanagawa (JP)

(72) Inventors: Yuzo Nagai, Kanagawa (JP); Shigehiro Kataoka, Kanagawa (JP); Yoshiyuki Kobayashi, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 654 days.

(21) Appl. No.: 17/706,623

(22) Filed: Mar. 29, 2022

(65) Prior Publication Data
US 2022/0320974 A1    Oct. 6, 2022

(30) Foreign Application Priority Data

Mar. 30, 2021 (JP) ................................. 2021-058304
Mar. 3, 2022 (JP) ................................. 2022-032957
Mar. 8, 2022 (JP) ................................. 2022-035267

(51) Int. Cl.
*H02K 11/33* (2016.01)
*H02K 3/50* (2006.01)
(Continued)

(52) U.S. Cl.
CPC ............... *H02K 11/33* (2016.01); *H02K 3/50* (2013.01); *H02K 5/203* (2021.01); *H02K 5/225* (2013.01);
(Continued)

(58) Field of Classification Search
CPC . H02K 11/33; H02K 3/50; H02K 5/20; H02K 5/203; H02K 5/22; H02K 5/225;
(Continued)

(56) References Cited

U.S. PATENT DOCUMENTS

| | | | |
|---|---|---|---|
| 7,262,528 B2 | 8/2007 | Amagasa | |
| 2016/0377065 A1* | 12/2016 | Parker | F04B 9/042 |
| | | | 417/413.1 |
| 2019/0301596 A1 | 10/2019 | Kobayashi et al. | |

FOREIGN PATENT DOCUMENTS

| | | |
|---|---|---|
| CN | 209908755 | 1/2020 |
| CN | 215292870 | 12/2021 |

(Continued)

OTHER PUBLICATIONS

English translation of JP-5903089-B2 (Year: 2016).*
English translation of WO-2022075317-A1 (Year: 2022).*

*Primary Examiner* — Tulsidas C Patel
*Assistant Examiner* — Joshua Kiel M Rodriguez
(74) *Attorney, Agent, or Firm* — JCIPRNET

(57) ABSTRACT

An electric pump includes: a motor including a shaft; a pump mechanism coupled to an axial one side of the shaft; a circuit substrate located outward in a radial direction orthogonal to the axial direction of the shaft, and a housing capable of accommodating the motor and the circuit substrate. The circuit substrate includes a plate surface facing the shaft and following the axial direction. The housing includes a motor housing part, a substrate housing part, a pump housing part, and an attachment plate part located outward in a radial direction. The attachment plate part includes an attachment surface facing the shaft and following the axial direction. The motor and the pump mechanism are located on an inner angle side of an angle at which a third surface including the plate surface and a fourth surface including the attachment surface intersect.

18 Claims, 10 Drawing Sheets

(51) Int. Cl.
*H02K 5/20* (2006.01)
*H02K 5/22* (2006.01)

(52) U.S. Cl.
CPC ...... *H02K 2203/09* (2013.01); *H02K 2211/03* (2013.01)

(58) Field of Classification Search
CPC .. H02K 2203/09; H02K 2211/03; H02K 7/14; F04B 17/03; F04B 53/08; F04B 53/16
See application file for complete search history.

(56) References Cited

FOREIGN PATENT DOCUMENTS

| | | |
|---|---|---|
| CN | 114251259 | 3/2022 |
| CN | 116529487 | 8/2023 |
| JP | 2004159392 | 6/2004 |
| JP | 5903089 B2 * | 4/2016 |
| WO | WO-2022075317 A1 * | 4/2022 |

* cited by examiner

ELECTRIC PUMP

CROSS REFERENCE TO RELATED APPLICATIONS

The present invention claims priority under 35 U.S.C. § 119 to Japanese Application No. 2022-032957 filed on Mar. 3, 2022, which claims priority to Japan Application No. 2021-058304, filed on Mar. 30, 2021. The present invention also claims priority under 35 U.S.C. § 119 to Japanese Application No. 2022-035267 filed on Mar. 8, 2022. The entire content of each of the above applications is incorporated herein by reference.

FIELD OF THE INVENTION

The present disclosure relates to an electric pump.

BACKGROUND

Conventionally, a configuration in which a heat sink is provided outside a motor unit, a power-system circuit component such as an FET is secured to the heat sink with a screw, and heat generated in the power-system circuit component is dissipated is known.

In a conventional motor unit, there are a concern that it may not be possible to quickly dissipate heat generated from the motor and the motor may break down due to a high temperature, a concern that it may not be possible to extend an operating time in a high output state, and a concern that the body of the motor may have an increased size.

SUMMARY

According to an exemplary embodiment, an electric pump includes: a motor including a shaft that is rotatable about a center axis; a pump mechanism coupled to one side of the shaft in an axial direction; a circuit substrate located outward in a radial direction orthogonal to the axial direction of the shaft; and a housing capable of accommodating the motor and the circuit substrate. The circuit substrate includes plate surfaces that are a first surface that faces the shaft, follows the axial direction, and includes an electronic component and a second surface on a side opposite to the first surface. The housing includes a motor housing part accommodating the motor, a substrate housing part accommodating the circuit substrate, a pump housing part accommodating the pump mechanism, and an attachment plate part located outward in a radial direction orthogonal to the axial direction of the shaft. The attachment plate part includes an attachment surface that faces the shaft and follows the axial direction. The motor and the pump mechanism are located on an inner angle side of an angle at which a third surface including the plate surfaces and a fourth surface including the attachment surface intersect each other.

The above and other elements, features, steps, characteristics and advantages of the present disclosure will become more apparent from the following detailed description of the preferred embodiments with reference to the attached drawings.

DESCRIPTION OF THE EMBODIMENTS

Figure 1:
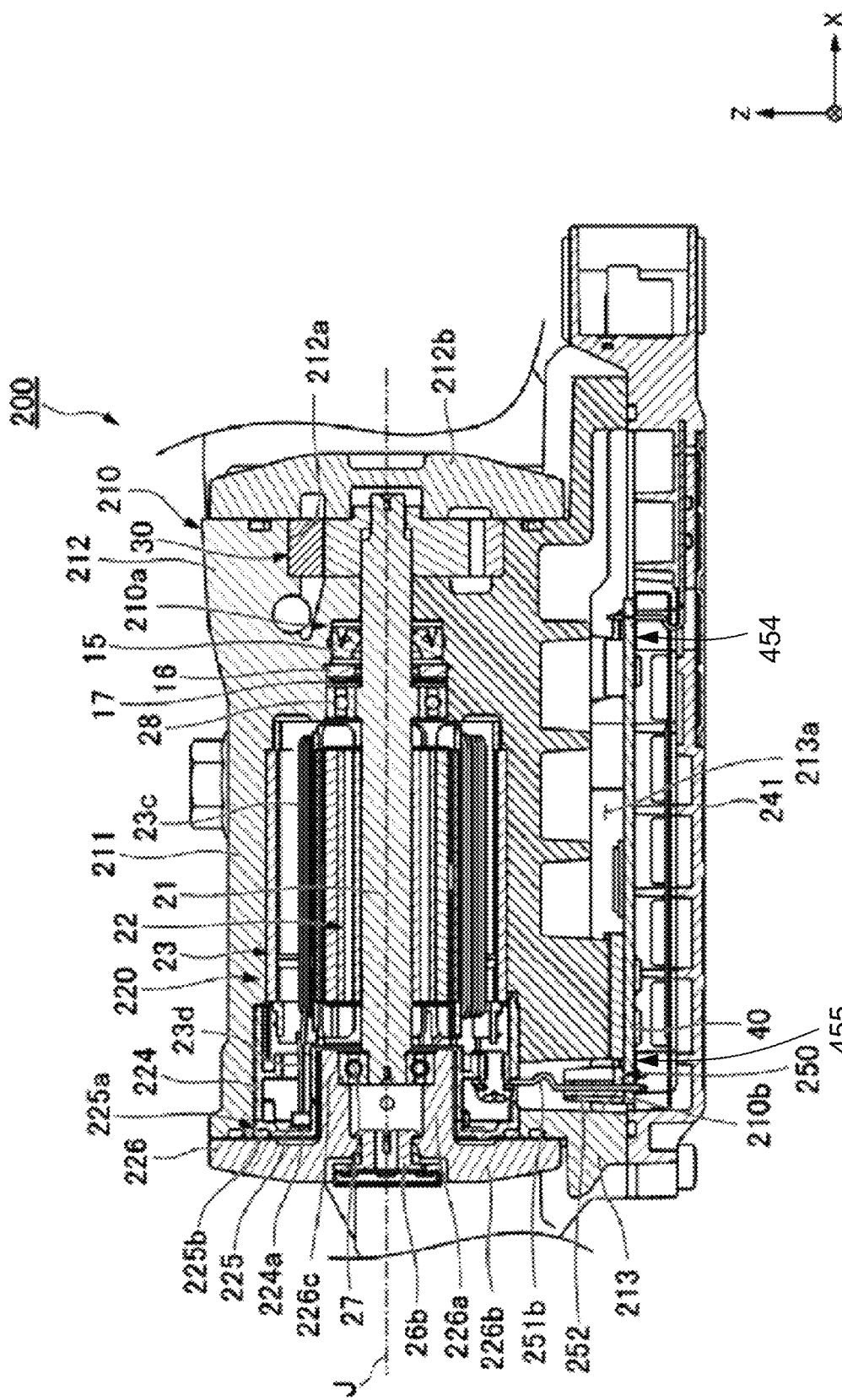
FIG. 1 is a sectional view of an electric pump according to the present embodiment.

Hereinafter, an electric oil pump will be described as an example of the present embodiment of an electric motor and an electric pump. The electric oil pump in the embodiment is used to supply oil to equipment mounted in a vehicle or the like.

In each drawing referred to below, an XYZ coordinate system will be appropriately illustrated as a three-dimensional orthogonal coordinate system. In the XYZ coordinate system, the X-axis direction is assumed to be a direction that is parallel to an axial direction of a center axis J illustrated in FIGS. 1 and 5. The center axis J is a center axis line of a shaft 21 of a motor 220, which will be described later. The Y-axis direction is a direction that is parallel to the depth direction in FIGS. 1 and 5 out of the directions orthogonal to the X axis. The Z-axis direction is a direction orthogonal to both the X-axis direction and the Y-axis direction and is a direction that is parallel to the up-down direction in FIGS. 1 and 5. The sides on which the arrows in the drawings are directed are the + side, and the opposite sides are the − sides in all of the X-axis direction, the Y-axis direction, and the Z-axis direction.

In the following description, the direction (X-axis direction) that is parallel to the center axis J will be simply referred to as an "axial direction" unless particularly indicated otherwise. A radial direction centered on the center axis J will be simply referred to as a "radial direction". A circumferential direction around the center axis J, that is, the direction around the center axis J (θ direction) will be simply referred to as a "circumferential direction".

Also, the positive side (+X side) in the X-axis direction may be referred to as a "front side". Similarly, the negative side (−X side) in the X-axis direction may be referred to as a "rear side". The front side (+X side) corresponds to one side in the axial direction in the present disclosure. The rear side (−X side) corresponds to the other side in the axial direction in the present disclosure.

Hereinafter, an electric oil pump 200 according to the present embodiment will be described with reference to FIGS. 1 to 13.

Figure 2:
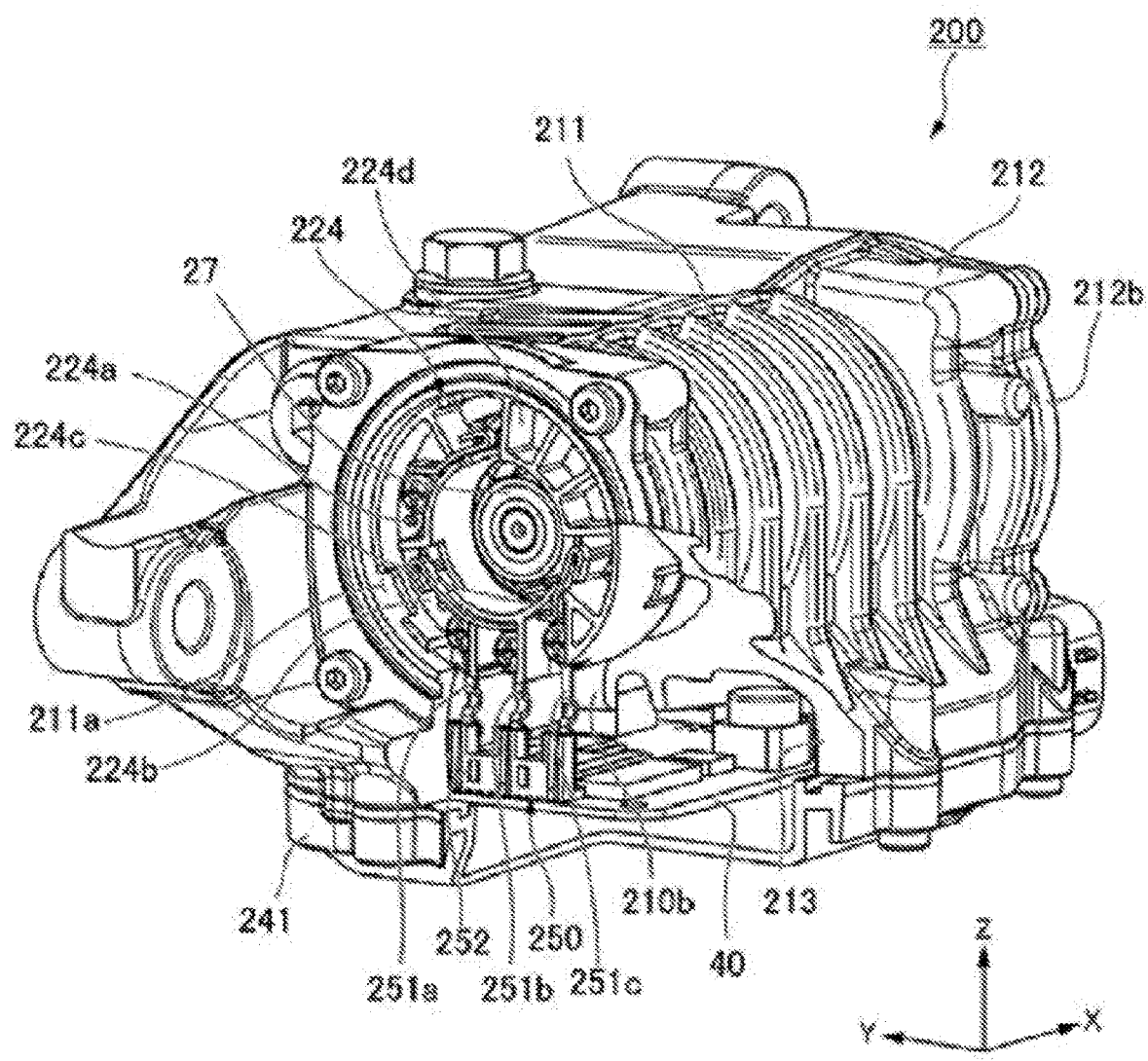
FIG. 2 is a perspective view illustrating an internal structure of the electric pump according to the present embodiment.
Figure 3:
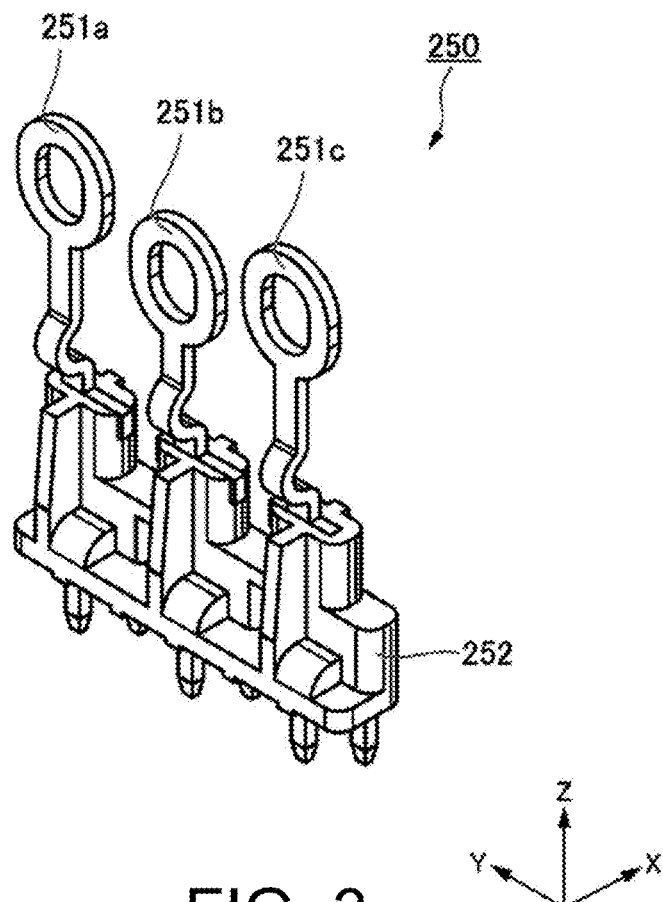
FIG. 3 is a perspective view illustrating a busbar unit according to the present embodiment.

The electric oil pump 200 according to the present embodiment includes a housing 210, a motor 220, a pump mechanism 30, and a circuit substrate 40 as illustrated in FIGS. 1 and 2.

The housing 210 includes a motor housing 211 (motor accommodation part) that accommodates the motor 220, a pump housing 212 that accommodates the pump mechanism 30, a substrate housing 213 (circuit substrate accommodation part) that accommodates the circuit substrate 40, a partition wall part 330 that partitions the motor housing 211 (motor accommodation part) and the substrate housing 213 (circuit substrate accommodation part), a projecting part 300 that projects from the partition wall part 330, a coupling part 310, and a substrate cover 241. In the case of the present embodiment, the motor housing 211 that is the motor accommodation part, the pump housing 212, the substrate housing 213 that is the circuit substrate accommodation part, the partition wall part 330, and the projecting part 300 are parts of a single member.

The motor housing 211 that is the motor accommodation part is located on the rear side (−X side) of the housing 210. The motor housing 211 has a cylinder shape extending in the axial direction. The motor housing 211 includes a first accommodation recessed part 211a that is a recessed portion opening on the rear side. The first accommodation recessed part 211a is blocked with a bearing holder 226, which will be described later, from the rear side.

The pump housing 212 is located on the front side (+X side) of the housing 210. The pump housing 212 includes a second accommodation recessed part 212a that is a recessed part opening on the front side. The electric oil pump 200 includes a pump cover 212b that blocks the second accommodation recessed part 212a from the front side.

The substrate housing 213 that is the circuit substrate accommodation part is located on side surfaces of the motor housing 211 (motor accommodation part) and the pump housing 212 that are aligned in the axial direction. The substrate housing 213 is located on the lower side (−Z side) of the motor housing 211 and the pump housing 212 in the drawing. The substrate housing 213 has a substantially rectangular shape when seen from the outer side in the radial direction. The substrate housing 213 has a shape with a long side in the axial direction and a short side in a direction that intersects the axial direction. The substrate housing 213 includes a third accommodation recessed part 213a that opens toward the lower side of the housing 210 in the drawing.

The housing 210 includes a first through-hole 210a that connects, in the axial direction, the first accommodation recessed part 211a of the motor housing 211 that is the motor accommodation part and the second accommodation recessed part 212a of the pump housing 212. The housing 210 includes a second through-hole 210b that connects, in the radial direction, the first accommodation recessed part 211a and the third accommodation recessed part 213a of the substrate housing 213 that is the circuit substrate accommodation part. In other words, the second through-hole 210b is an accommodation part that extends in the radial direction between the motor housing 211 and the substrate housing 213 and accommodates joint busbars 251a to 251c, which will be described later. The accommodation part may be a groove that opens in the axial direction and extends in the radial direction.

The motor 220 includes a rotor 22 that includes a shaft 21, a stator 23 that includes a winding, a busbar assembly 224, a busbar cover 225, a bearing holder 226, a first bearing 27, and a second bearing 28. An end of the shaft 21 on the front side is coupled to the pump mechanism 30.

The stator 23 of the motor 220 is assembled with the housing 210 from the rear side (−X side) of the housing 210 through shrink-fitting, pressure-fitting, or insertion, for example. In a case of shrink-fitting, satisfactory assembly properties are achieved, the housing 210 holds the entire outer periphery of the stator 23 after the assembly, and satisfactory holding properties are thus obtained. In other words, the motor housing 211 that is the motor accommodation part of the housing 210 and the stator 23 are in a contact state.

Also, in a case in which assembly is achieved by insertion (gap fitting), a through-hole and a screw hole in the axial direction of the housing 210 may be provided on the outer side of the stator 23 in the radial direction, and the stator 23 may be inserted into the housing 210 (motor housing 211) and screwed with bolts or the like. In this case, an adhesive may be applied to a gap between the stator 23 and the housing 210 (motor housing 211) in the radial direction such that the gap is filled with the adhesive to enhance holding properties of the stator 23 in the radial direction. In other words, the motor housing 211 that is the motor accommodation part of the housing 210 and the stator 23 are connected via the adhesive.

Also, in the case in which assembly is achieved by insertion, the stator may be screwed in a state in which the stator 23 is placed to be close to the side of the circuit substrate 40 (+Z side) or the like (a state in which the stator 23 is in contact with the motor housing 211 of the housing 210) achieved using a jig in advance.

The circuit substrate 40 is a control substrate that includes, for example, a motor drive circuit 451, a control part 452 that controls driving of the motor, and a circuit (not illustrated) for preventing reverse connection. Also, the circuit substrate 40 includes a power source input part 454 and a motor power source output part 455. The circuit substrate 40 includes a plurality of heat generating components 43. Plate surfaces of the circuit substrate 40 include a first surface 411 that includes the heat generating components 43 and a second surface 412 on a side opposite to the first surface 411.

In the present embodiment, the circuit substrate 40 has a rectangular shape extending in the axial direction. In the present embodiment, the circuit substrate 40 has an oblong shape with rounded corners and with a long side in the axial direction and a short side in the direction (Y-axis direction) that intersects the axial direction. The circuit substrate 40 is located further outward than the motor 220 and the pump mechanism 30 in the radial direction, and the plate surfaces of the circuit substrate 40 are directed to the motor 220 and the pump mechanism 30. The circuit substrate 40 in the present embodiment includes a power source input part 454 at an end on the front side in the axial direction and a motor power source output part 455 at an end on the rear side in the axial direction.

The heat generating component 43 is, for example, a plurality of transistors 431 and a microcomputer 432. The plurality of transistors 431 constitute the motor drive circuit 451, for example, and the microcomputer 432 controls power distribution to the motor drive circuit 451.

The heat generating component 43 (see FIG. 13) is soldered to the first surface 411 of the circuit substrate 40, for example. The heat generating component 43 includes a metal surface 434 made of a metal plate to be soldered to the first surface 411 of the circuit substrate 40 and a resin surface 435 made of a resin that is not to be soldered to the first surface 411 of the circuit substrate 40. Once the metal surface 434 of the heat generating component 43 is soldered to face the first surface 411 of the circuit substrate 40, the resin surface 435 on the side opposite to the metal surface 434 is directed in the same direction as that of the first surface 411 of the circuit substrate 40.

The circuit substrate 40 (see FIG. 13) includes, in a region where the metal surface 434 of the heat generating component 43 is soldered, a substrate through-hole 413 (through-hole) that penetrates from the first surface 411 to the second surface 412 that is the plate surface on the side opposite to the first surface 411. The substrate through-hole 413 includes a copper foil on the inner surface of the hole and the surroundings of the location where the substrate through-hole 413 opens in the first surface 411 and the second surface 412. The copper foil is continuously defined and is connected between the first surface 411 side and the second surface 412 side. The location where the substrate through-hole 413 opens in the first surface 411, the inner surface of the substrate through-hole 413, and the location where the substrate through-hole 413 opens in the second surface 412 is able to transmit heat from the heat generating component 43 from the first surface 411 to the second surface 412 through the continuous copper foil. With this configuration, the circuit substrate 40 is able to dissipate heat of the heat generating component 43 from the side of the first surface 411 (from the heat generating component 43 itself) and is also able to dissipate the heat from the side of the second surface 412 as well.

The circuit substrate 40 is attached to the substrate housing 213 that is the circuit substrate accommodation part of the housing 210 with the first surface 411 or the second surface 412 that is a plate surface of the circuit substrate 40 directed to the side of the projecting part 300 (the side of the motor 220) such that the heat generating component 43 overlaps the projecting part 300 of the housing 210, which will be described later. In other words, the heat generating component 43 is disposed to overlap the projecting part 300. In a case in which the attachment is achieved with the first surface 411 directed to the side of the projecting part 300, it is possible to transmit the heat of the heat generating component 43 to the projecting part 300 by assembling the resin surface 435 of the heat generating component 43 such that it comes into contact with the projecting part 300. In other words, it is possible to dissipate the heat of the heat generating component 43 to the projecting part 300.

Also, in a case in which the attachment is achieved with the second surface 412 directed to the side of the projecting part 300, the circuit substrate 40 is attached to the substrate housing 213 that is the circuit substrate accommodation part of the housing 210 such that the heat generating component 43 overlaps the projecting part 300. Since the heat generating component 43 overlaps the projecting part 300, the attachment is achieved such that the substrate through-hole 413 in the region where the heat generating component 43 is soldered also overlaps the projecting part 300. The assembly may be achieved with a heat dissipating member 51 sandwiched between the second surface 412 of the circuit substrate 40 and the projecting part 300.

Figure 6:
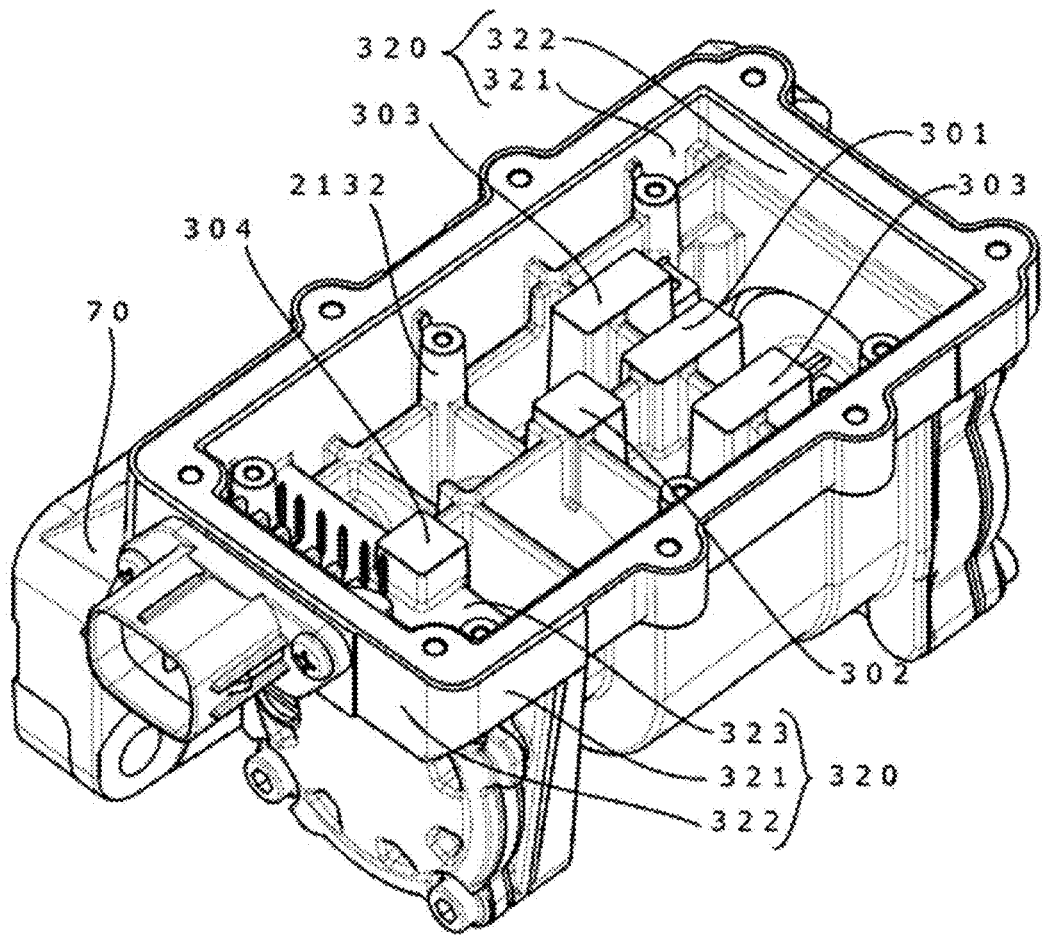
FIG. 6 is a perspective view illustrating inside of a third accommodation recessed part.

The busbar assembly 224 includes three busbars 224a, 224b, and 224c and a busbar holder 224d made of a resin for holding the busbars 224a to 224c as illustrated in FIG. 6. The busbar holder 224d has an annular shape when seen from the axial direction. The three busbars 224a to 224c are screwed to the surface of the busbar holder 224d directed on the rear side.

The busbar assembly 224 is located on the rear side of the stator 23. The busbar assembly 224 is inserted, from the rear side, into the first accommodation recessed part 211a of the motor housing 211.

Ends of the three busbars 224a to 224c on one side are connected to a coil wire 23d extending from a coil 23c to the rear side. The three busbars 224a to 224c extend from the position of the connection to the coil wire 23d to the side of the substrate housing 213. Ends of the three busbars 224a to 224c on the other side are disposed at an end of the busbar holder 224d on the side of the substrate housing 213 (lower side in the drawing). The ends of the three busbars 224a, 224b, and 224c on the other side are connected to three joint busbars 251a, 251b, and 251c, which will be described later, respectively.

Figure 5:
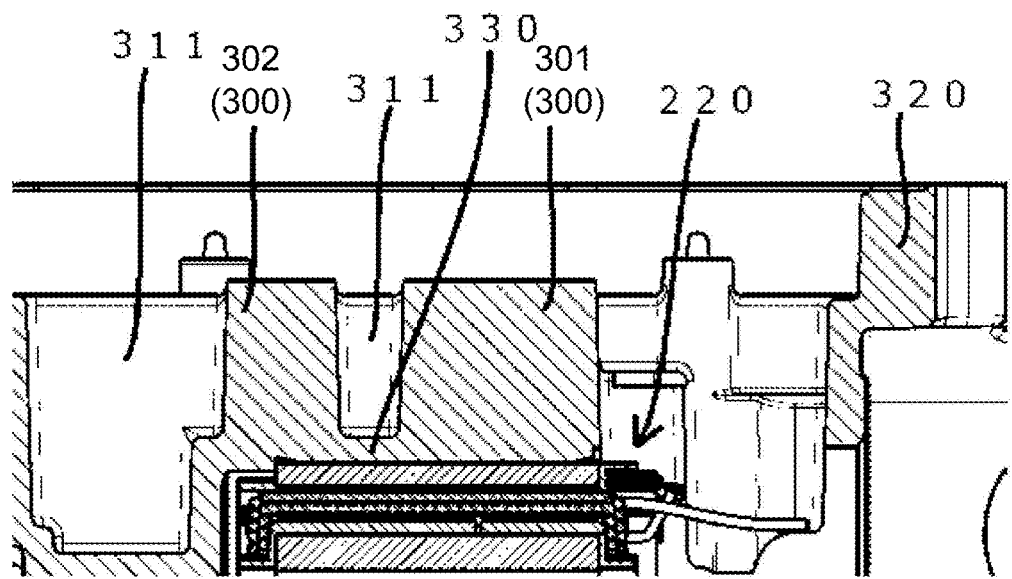
FIG. 5 is a partial sectional view of a housing and a motor.

The busbar cover 225 is located on the rear side of the busbar assembly 224 as illustrated in FIG. 5. The busbar cover 225 is inserted into the first accommodation recessed part 211a from the rear side. The busbar cover 225 has an annular shape when seen from the axial direction. The busbar cover 225 covers the busbar assembly 224 from the rear side. A bearing holder 226 is placed over the busbar cover 225 from the rear side. The bearing holder 226 blocks the first accommodation recessed part 211a from the rear side.

The busbar cover 225 includes a stepped part 225a at an outer peripheral end of the surface directed to the rear side. The stepped part 225a includes a surface directed to the rear side and the surface directed outward in the radial direction. An elastic member 225b configured by an O ring is disposed inside the stepped part 225a. The elastic member 225b is sandwiched between the bearing holder 226 and the busbar cover 225 in the axial direction. The bearing holder 226 pushes the busbar cover 225 on the front side via the elastic member 225b.

The busbar cover 225 functions as a spacer inserted between the busbar assembly 224 and the bearing holder 226. The busbar cover 225 is pushed on the front side by the elastic member 225b and pushes the busbar assembly 224 on the front side. With this configuration, the busbar cover 225 fixes the busbar assembly 224 in the axial direction. The busbar cover 225 and the busbar assembly 224 may be parts of a single member.

The bearing holder 226 is a circular plate-shaped member that covers the busbar cover 225 from the rear side. The bearing holder 226 includes a cylindrical part 226a extending along the center axis J and a holder main body 226b spreading outward in the radial direction from the outer peripheral surface of the cylindrical part 226a. The cylindrical part 226a opens on both sides in the axial direction. The first bearing 27 is inserted into the opening part of the cylindrical part 226a on the front side. The first bearing 27 is supported, from the rear side, by a bearing support surface 226c located inside the cylindrical part 226a.

The bearing holder 226 spreads up to the outside of the busbar cover 225 in the radial direction. The bearing holder 226 is screwed to the housing 210 on the outer side of the busbar cover 225 in the radial direction. A breather 26b is inserted into an end of the cylindrical part 226a on the rear side.

The second bearing 28 is inserted, from the rear side, into the first through-hole 210a that connects the first accommodation recessed part 211a to the second accommodation recessed part 212a. An oil seal 15, a fixing ring 16, a wave washer 17, and a second bearing 28 are disposed in order from the front side inside the first through-hole 210a.

The shaft 21 is inserted into inner holes of the second bearing 28, the wave washer 17, the fixing ring 16, and the oil seal 15. The pump mechanism 30 is coupled to an end of the shaft 21 on the front side.

The busbar unit 250 connects the motor 220 to the circuit substrate 40. The busbar unit 250 is connected to an end of the circuit substrate 40 on the rear side. The busbar unit 250 is accommodated inside the second through-hole 210b that connects the third accommodation recessed part 213a to the first accommodation recessed part 211a. Also, the motor 220 and the circuit substrate 40 may be connected directly to each other with the three busbars 224a to 224c without using the busbar unit 250. For example, the three busbars 224a to 224c and a member that serves as a fixing tool may be integrally molded using a resin, and the integrally molded article may be screwed to the housing 210 at a fixing location of the fixing tool. At this time, the ends of the three busbars 224a to 224c on one side may be connected to the coil wire 23d, and the ends of the three busbars 224a to 224c on the other side may pass through the second through-hole 210b and may be connected to the circuit substrate 40. With such a configuration, it is not necessary for the busbar holder 224d to have an annular shape when seen from the axial direction, and by elongating the annular shape of the busbar cover 225 made of a resin when seen from the axial direction into the axial direction and shaping it into a tubular shape as well, the busbar cover 225 is also able have the annular shape of the busbar holder 224d and separate the housing 210 from the busbars 224a to 224c.

Ends of the joint busbars 251a to 251c on one side extend from the joint busbar holder 252 toward the motor 220. Ends of the joint busbars 251a to 251c on the other side extend from the joint busbar holder 252 toward the circuit substrate 40.

The ends of the three joint busbars 251a to 251c on the other side penetrate through the circuit substrate 40 in the thickness direction. The ends of the three joint busbars 251a to 251c on the other side are soldered and joined to a wiring pattern on the circuit substrate 40. Even in the case in which the motor 220 and the circuit substrate 40 are connected directly to each other with the three busbars 224a to 224c without using the three joint busbars 251a to 251c, the ends of the three busbars 224a to 224c on the other side may penetrate through the circuit substrate 40 in the thickness direction and may be soldered and joined to the wiring pattern on the circuit substrate 40 in a similar manner.

The housing 210 further includes a plate-shaped attachment plate part 70 for attaching the electric oil pump 200 to an attachment target body to which the electric oil pump 200 is attached, such as an oil pan for a vehicle, for example. The attachment plate part 70 includes an attachment surface 71 spreading in the axial direction, and the electric oil pump 200 is fixed to the attachment target body with a fixing member in a state in which the attachment surface 71 is in contact with the attachment target body. In other words, the housing 210 includes the attachment surface 71 that spreads in the axial direction and comes into contact with the attachment target body. Also, the housing 210 includes an attachment plate part 70 extending in the axial direction and including the attachment surface 71. It is not necessary for the attachment surface 71 to continue over the entire attachment plate part 70 in the axial direction, and the attachment surface 71 may be configured in a split manner at a plurality of locations. As a fixing member, a bolt, a pressure-fitting pin, or a rivet, for example, may be used. In the present embodiment, a bolt is employed as the fixing member in consideration of easiness in disassembly and the like.

The attachment plate part 70 is located on side surfaces of the motor housing 211 (motor accommodation part) and the pump housing 212 that are aligned in the axial direction. The attachment plate part 70 is located on the outer side of the motor housing 211 and the pump housing 212, which are aligned in the axial direction, in the radial direction. The attachment plate part 70 has a thickness in a direction away from the motor housing 211 and the pump housing 212. The attachment surface 71 of the attachment plate part 70 is the furthest in the +Y-axis direction through the thickness of the attachment plate part 70 from the side of the motor 220 and the pump mechanism 30 (the side of the center axis J). The attachment surface 71 is not limited to the +Y-axis direction through the thickness of the attachment plate part 70 from the side of the motor 220 and the pump mechanism 30 (the side of the center axis J). For example, the attachment surface 71 may be provided in the −Y-axis direction (see FIG. 2) of the attachment plate part 70 that is the side of the motor 220 and the pump mechanism 30 (the side of the center axis J). By placing the attachment surface 71 that comes into contact with the attachment target body on the side of the center axis J, it is possible to attach the electric oil pump 200 to the attachment target body in a state in which the attachment plate part 70 is disposed outside the electric oil pump 200, and the attachment plate part 70 is able to play a role of protecting the motor and the pump mechanism from adverse influences from the outside. By providing a columnar boss or the like at the attachment target body, it is possible to achieve the attachment to the attachment target body even if the attachment surface 71 is located in the −Y-axis direction of the attachment plate part 70 that is the side of the center axis J.

Figure 10:
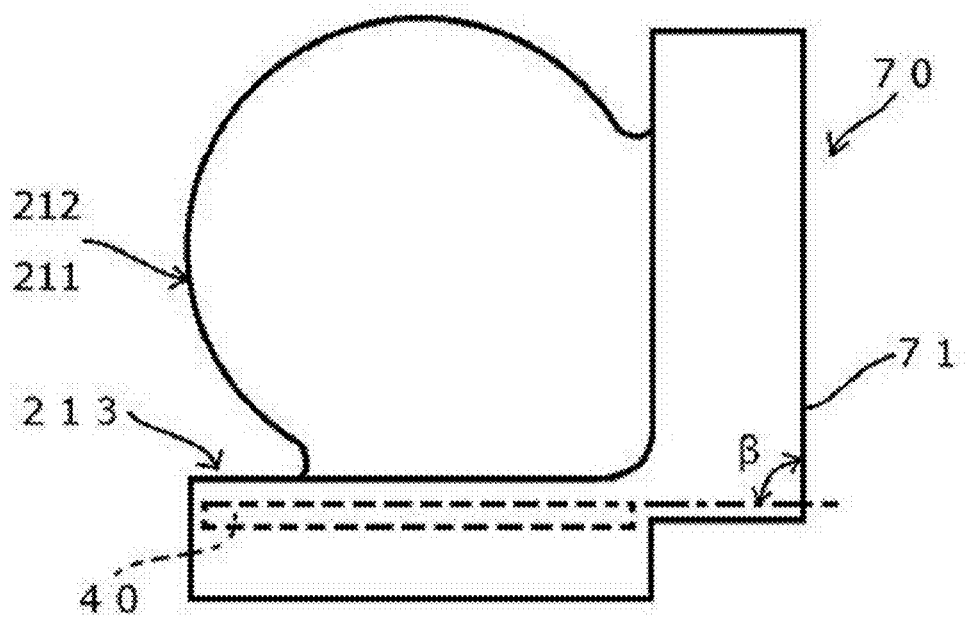
FIG. 10 is an overview diagram of the electric pump according to the present embodiment when seen from the axial direction.
Figure 11:
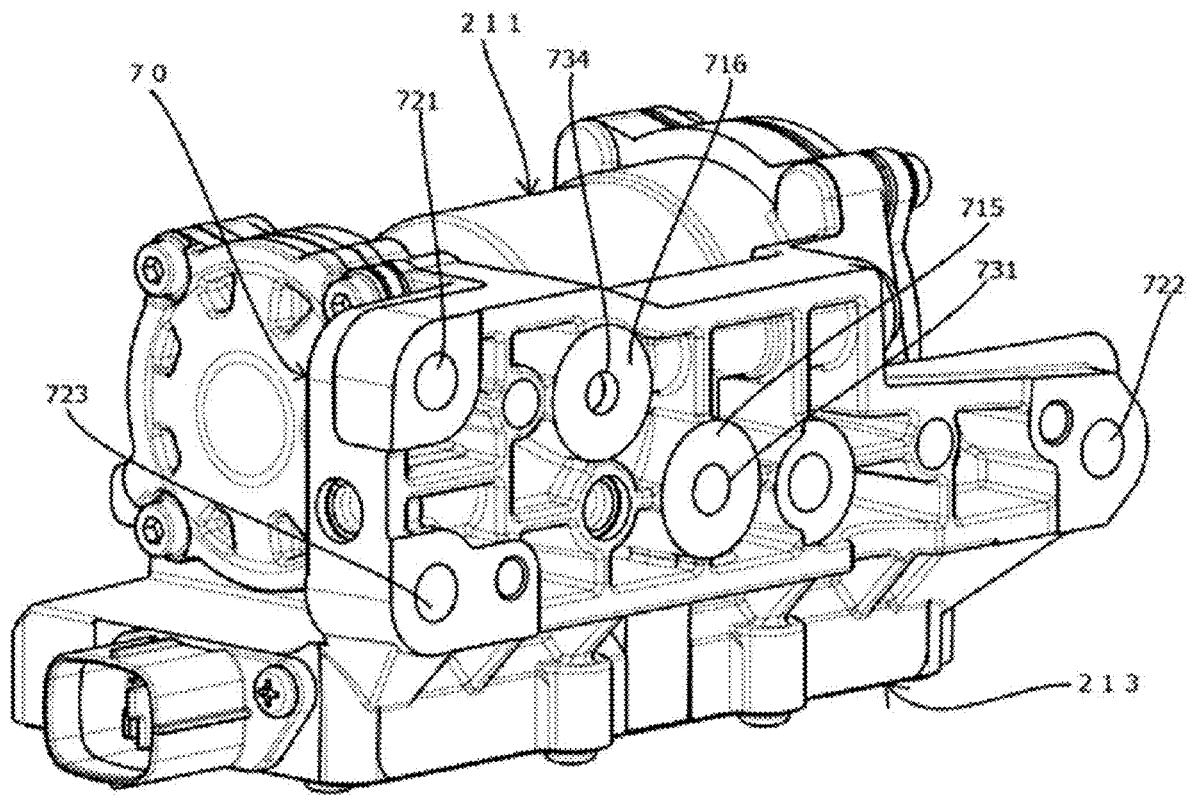
FIG. 11 is a perspective view illustrating an appearance structure of the electric pump according to the present embodiment.
Figure 12:
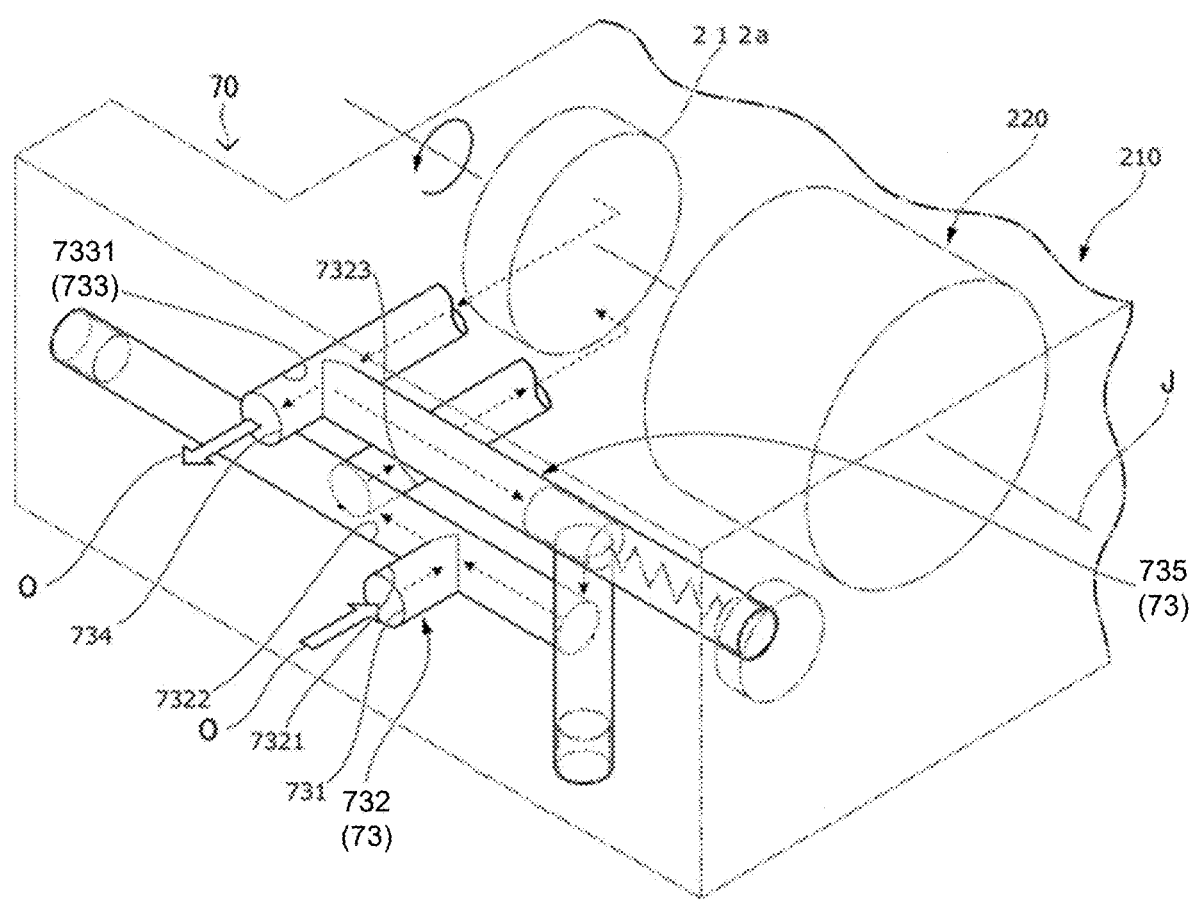
FIG. 12 is a perspective view schematically illustrating each flow path according to the present embodiment.
Figure 13:
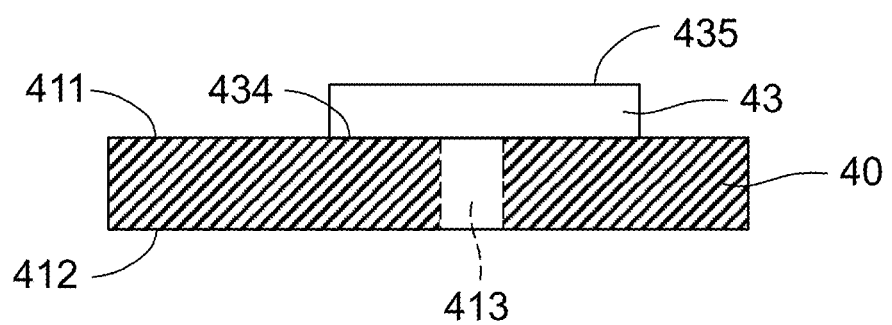
FIG. 13 is a schematic view illustrating a heat generating component is soldered on a circuit substrate.

The attachment plate part 70 is located in a relationship in which the attachment surface 71 and the plate surfaces 411 and 412 of the circuit substrate 40 intersect each other. In other words, the attachment plate part 70 and the attachment surface 71, and the substrate housing 213 that is the circuit substrate accommodation part and the plate surface (411 or 412) of the circuit substrate 40 are located on the side surfaces of the motor housing 211 and the pump housing 212 that are aligned in the axial direction, and the attachment plate part 70 and the attachment surface 71, and the substrate housing 213 and the plate surface of the circuit substrate 40 are in a positional relationship of a direction in which they intersect each other. Therefore, an extended plane of the attachment surface 71 intersects an extended plane of the plate surface of the circuit substrate 40. In the present embodiment, the attachment plate part 70 extends in the +Z direction, and the circuit substrate 40 extends in the −Y direction as illustrated in FIGS. 10 and 2. If both or one of the attachment surface 71 and the plate surface (411 or 412) of the circuit substrate 40 virtually extends, then it comes into contact with the Z direction in the Y direction, and a corner part is defined between the Z direction and the Y direction. The motor 220 (motor housing 211) and the pump mechanism 30 (pump housing 212) are located on the side of an inner angle β that is able to be defined by both or one of the attachment surface 71 and the plate surface (411 or 412) of the circuit substrate 40 being virtually extended. In other words, the motor 220 (motor housing 211) and the pump mechanism 30 (pump housing 212) are located on the inner angle side of the angle at which a third surface obtained by virtually extending the attachment surface 71 intersects a fourth surface obtained by virtually extending the plate surface of the circuit substrate 40. Alternatively, the motor 220 (motor housing 211) and the pump mechanism 30 (pump housing 212) are located on an inner angle side of an angle at which the third surface obtained by virtually extending the attachment surface 71 intersects the plate surface of the circuit substrate 40 or on an inner angle side of an angle at which the attachment surface 71 intersects the fourth surface obtained by virtually extending the plate surface of the circuit substrate 40.

With this configuration, it is possible to achieve size reduction in the radial direction as compared with a case in which the attachment plate part 70, the motor 220 and the pump mechanism 30, and the circuit substrate 40 are disposed in this order in a direction away from the attachment surface 71 along the attachment surface 71. Also, it is possible to achieve size reduction as compared with a case in which the plate surfaces of the circuit substrate 40 are disposed in a direction that intersects the axial direction. With a configuration in which the plate surfaces of the circuit substrate 40 that is the control substrate are disposed in a direction that intersects the axial direction, there is a concern that the long side of the circuit substrate 40 becomes longer than the motor 220 or the pump mechanism 30 in the radial direction, and it is thus not possible to achieve size reduction in the radial direction. In the case in which it is not possible to achieve size reduction in the radial direction, there is a concern that the electric oil pump 200 to be attached to an oil pan or the like of a vehicle may interfere with a transmission or a body-related member in the vicinity thereof in the vehicle.

In the present embodiment, the circuit substrate 40 includes a power source input part 454 at an end on the front side in the axial direction and a motor power source output part 455 at an end on the rear side in the axial direction. The power input to the power source input part 454 disposed at the end of the circuit substrate 40 on the front side in the axial direction is output from the motor power source output part 455 disposed at the end of the circuit substrate 40 on the rear side in the axial direction via the substrate wiring pattern provided on the circuit substrate 40. In other words, the power source is input to the substrate wiring pattern at the end of the circuit substrate 40 on the front side in the axial direction and is then output from the end of the circuit substrate 40 on the rear side in the axial direction to the busbars of the motor 220. With such a configuration, it is possible to employ the following substrate wiring pattern for the circuit substrate 40. In other words, this is a substrate wiring pattern in which a route for reverse flow from the rear side to the front side in the axial direction is not provided or minimized in the process in which the flow of the power input to the power source input part 454 inside the circuit substrate 40 reaches the motor power source output part 455. Therefore, according to the electric oil pump 200, the motor power source output part 455 is able to shorten the entire extension of the substrate wiring pattern and achieve size reduction (area reduction) of the circuit substrate 40 as compared with a configuration in which the motor power source output part 455 is disposed at a location that is different from the end of the circuit substrate 40 on the rear side in the axial direction. Since the route for reverse flow from the rear side to the front side in the axial direction is not provided, the substrate wiring pattern is not needed in the short-side direction (Y-axis direction) of the circuit substrate 40, and it is thus possible to reduce the size of the circuit substrate 40 in the short-side direction (second short-side direction) and to reduce the entire size of the electric oil pump 200 in the radial direction. It is possible to reduce the size of the electric oil pump 200 in the radial direction by disposing the long side of the circuit substrate 40 in the axial direction and disposing it on the side surfaces of the motor 220 and the pump mechanism 30 that are aligned in the axial direction.

The attachment plate part 70 is smaller than the motor housing 211 and the pump housing 212 in the direction (Z direction) that intersects the axial direction when the axial direction is horizontally seen from the side of the attachment surface 71 of the attachment plate part 70. With this configuration, the attachment plate part 70 does not project further outward than the outer shapes of the motor housing 211 and the pump housing 212, and it is thus possible to reduce the size of the electric oil pump 200 in the radial direction.

The attachment plate part 70 includes at least two attachment holes 721 and 722, and the attachment holes 721 and 722 are located further outward than the pump housing 212 in the axial direction and further outward than the motor housing 211 in the axial direction. Also, the attachment holes 721 and 722 are present between the motor housing 211 and the pump housing 212 in the Z direction from the substrate housing 213. With this configuration, the attachment holes 721 and 722 do not project outward in the radial direction, and it is thus possible to achieve size reduction in the radial direction.

The attachment plate part 70 includes an inlet port 731 through which a fluid suctioned and ejected by the pump mechanism 30 is suctioned, an outlet port 734 through which the fluid is ejected, and a flow path 73 through which the fluid flows within a range from the front-side attachment hole 721 (first attachment hole 721) to the rear-side attachment hole 722 (second attachment hole 722) in the axial direction. With this configuration, the attachment plate part 70 includes the inlet port 731, the outlet port 734, and the flow path 73, and it is thus possible to achieve size reduction as compared with a case in which there is a structure including the inlet port 731, the outlet port 734, the flow path 73, and the like in the surroundings of the attachment plate part 70.

The inlet port 731 and the outlet port 734 are included within a range from the first attachment hole 721 to the second attachment hole 722 of the attachment plate part 70 in the axial direction. With this configuration, the inlet port 731 and the outlet port 734 are included within a range between the first attachment hole 721 and the second attachment hole 722, which are located further outward than the motor housing 211 in the axial direction and further outward than the pump housing 212 in the axial direction, in the axial direction, the inlet port 731 and the outlet port 734 are thus not located further outward than the attachment holes 721 and 722 in the axial direction, the size is thus reduced in the axial direction.

The attachment plate part 70 further includes a front-side attachment hole 723 (third attachment hole 723). The third attachment hole 723 deviates in the radial direction (Z direction) of the center axis J relative to the first attachment hole 721 when the attachment surface 71 is seen from the front. The fixing to the attachment target body is improved, and fixing of the electric oil pump 200 is stabilized, by the attachment plate part 70 further including the third attachment hole 723. The fixing at the three locations, namely the first to third attachment holes improves and stabilizes fixing of the electric oil pump 200, the fixing of the inlet port 731 and the outlet port 734 to the attachment target body is thus improved and stabilized. The inlet port 731 and the outlet port 734 are included within a range from the first attachment hole 721 to the third attachment hole 723 in the attachment plate part 70 in the radial direction (Z direction). With this configuration, the attachment plate part 70 is present at a part from the substrate housing 213 to the motor housing 211 and the pump housing 212 in the Z direction, and the inlet port 731 and the outlet port 734 are included within the range from the first attachment hole 721 to the third attachment hole 723 of the attachment plate part 70 in the radial direction (Z direction), and it is thus possible to achieve size reduction in the radial direction as compared with a case in which the inlet port 731 and the outlet port 734 are present further outward than the attachment holes 721 and 723 in the radial direction. The inlet port 731 and the outlet port 734 do not project in the Z direction beyond the outer shape of the attachment plate part 70, and a small size is thus achieved.

The inlet port 731 and the outlet port 734 deviate from each other in the axial direction when seen from the side of the attachment surface 71 (when seen from the + side to the − side in the Y direction). In the present embodiment, the inlet port 731 is located further rearward than the outlet port 734 in the axial direction. Moreover, the inlet port 731 is located further downward than the outlet port 734 in the Z direction when seen with the + side in the Z direction directed upward. With this configuration, it is possible to achieve size reduction in the radial direction as compared with a case in which the inlet port 731 and the outlet port 734 are located at the same locations in the axial direction and the inlet port 731 and the outlet port 734 are disposed in this order from the lower side in the Z direction.

In the present embodiment, it is not necessary for the attachment surface 71 to be continuously defined over the entire attachment plate part 70, and the attachment surface 71 may be partially configured. The attachment surface 71 may be provided at locations which come into contact with the attachment target body. The attachment surface 71 may be configured only in the surroundings of the first attachment hole 721 to the third attachment hole 723, the inlet port 731, and the outlet port 724, for example. The attachment surface 71 may be present in the surroundings of a positioning location.

The attachment surface 71 may include an inlet port surface part 715 in the surroundings of the inlet port 731 and the outlet port surface part 716 in the surroundings of the outlet port 734. It is possible to achieve further size reduction in the radial direction by disposing the inlet port 731 and the inlet port surface part 715, and the outlet port 734 and the outlet port surface part 716 with deviation in the axial direction as compared with a case in which the inlet port 731 and the inlet port surface part 715, and the outlet port 734 and the outlet port surface part 716 are disposed to be aligned in the Z direction at the same locations in the axial direction.

The flow path 73 includes an inlet-side flow path 732 and an outlet-side flow path 733. The inlet-side flow path 732 includes a first inlet flow path 7321 that is directed from the inlet port 731 to the side of the pump mechanism 30 and extends in a direction that intersects the axial direction, a third inlet flow path 7323 that extends from the side of the pump mechanism 30 and the pump housing 212 to the side of the attachment plate part 70, and a second inlet flow path 7322 connected to the first inlet flow path 7321 and the third inlet flow path 7323. Also, the outlet-side flow path 733 includes a first outlet flow path 7331 extending from the side of the pump mechanism 30 and the pump housing 212 to the side of the attachment plate part 70, for example. Only one outlet-side flow path 733 may be provided, or two or more, namely a plurality of outlet-side flow paths 733 may be provided. In the case of the present embodiment, the flow path 73 includes a relief flow path 735 that is branching from the first outlet flow path 7331 and is connected to the position of the first inlet flow path 7321 away from the side of the second inlet flow path 7322. The relief flow path 735 is a flow path for a fluid ejected by the pump mechanism 30 to reversely flow to the side of the inlet-side flow path 732. In the present embodiment, the relief flow path 735 includes a flow path that follows the axial direction and a flow path directed in a direction that intersects the axial direction. In the present embodiment, the third inlet flow path 7323 is a final inlet flow path connected to the pump mechanism 30 and the pump housing 212 in the flow path (route) up to the pump mechanism 30 with reference to the inlet port 731. The final inlet flow path is not limited to the third inlet flow path 7323.

The third inlet flow path 7323 (final inlet flow path 7323) and the first outlet flow path 7331 communicate with the attachment plate part 70 and the pump housing 212 along the mutual flow paths. In the present embodiment, the final inlet flow path 7323 and the first outlet flow path 7331 are linearly connected from the attachment plate part 70 to the pump housing 212. The final inlet flow path 7323 and the first outlet flow path 7331 are defined through die molding or cutting, for example, from the side of the attachment surface 71. Since the final inlet flow path 7323 connected to the pump housing 212 and the first outlet flow path 7331 are linear, a resistance caused when the pump mechanism 30 suctions and ejects the fluid is reduced, and it is thus possible to curb degradation of performance of the pump. Also, since the final inlet flow path 7323 connected to the pump housing 212 and the first outlet flow path 7331 are linear, the housing 210 is easily produced.

The third inlet flow path 7323 is worked and produced using a drill or the like from the side of the attachment surface 71 of the attachment plate part 70. At this time, a lid member, a cap member, or the like is attached to the open location opening in the attachment plate part 70 through pressure-fitting, screw fitting, or the like in order to block connection between the third inlet flow path 7323 and the outside.

The third inlet flow path 7323 is located further frontward than the inlet port 731 and the attachment surface (inlet port surface part) 715 in the surroundings of the inlet port in the axial direction and further downward than the outlet port 734 in the Z direction. With this configuration, the third inlet flow path 7323 (final inlet flow path 7323) that does not require an attachment surface is able to be disposed in a region in the attachment plate part 70 on the front side of the inlet port 731 and the attachment surface (inlet port surface part) 715 in the surroundings of the inlet port in the axial direction and on the lower side of the outlet port 734 in the Z direction, and it is thus possible to reduce the size of the attachment plate part 70 in the Z direction even if the outlet port 734 and the third inlet flow path 7323 (final inlet flow path 7323) are disposed at close locations in the axial direction. In other words, it is possible to achieve size reduction in the radial direction. Since the third inlet flow path 7323 (final inlet flow path 7323) and the first outlet flow path 7331 are connected linearly up to the pump housing 212 as described above, it is not necessary to form the pump housing 212 in a complicated shape, and it is possible to reduce the pump housing 212 and the housing 210 in the axial direction and the radial direction. It is not necessary for the third inlet flow path 7323 (final inlet flow path 7323) to be located at completely the same location as the outlet port 734 in the axial direction, and the third inlet flow path 7323 may deviate from the center of the outlet port 734 in the axial direction. The location where the third inlet flow path 7323 (final inlet flow path 7323) is disposed may be appropriately adjusted in consideration of the structure inside the housing 210 and performance of the pump mechanism 30.

In the present embodiment, the second inlet flow path 7322 and the relief flow path 735 extend along the axial direction, deviate on the side of the motor housing 211 and the pump housing 212 (Z direction) from the side of the substrate housing 213, and are disposed such that at least parts thereof overlap one another in the radial direction (Y direction). With such a configuration, the size is reduced in the radial direction. In other words, since the second inlet flow path 7322 and the relief flow path 735 provided in the attachment plate part 70 overlap one another in the Z direction, it is possible to reduce the thickness of the attachment plate part 70 in the Y direction and thereby to achieve size reduction in the radial direction. It is possible to reduce the size to obtain a thin thickness of the attachment plate part 70 and thereby to shorten the length from the attachment target body to the outer shape of the electric oil pump 200, which contributes to size reduction of the entire attachment target body and enables suppression of interference with members that may be present in the surroundings of the electric oil pump 200. Also, since it is possible to reduce the thickness of the attachment plate part 70, the distance by which the electric oil pump 200 sticks out of the attachment target body in the direction perpendicular to the attachment surface 71 is shortened. Since the distance by which the electric oil pump 200 sticks out is short, a moment related to the sticking distance and the weight of the electric oil pump 200 is small, vibration and noise caused when the electric oil pump 200 operates are reduced, and it is possible to reduce influences of vibration from the attachment target body on the electric oil pump 200.

Figure 4:
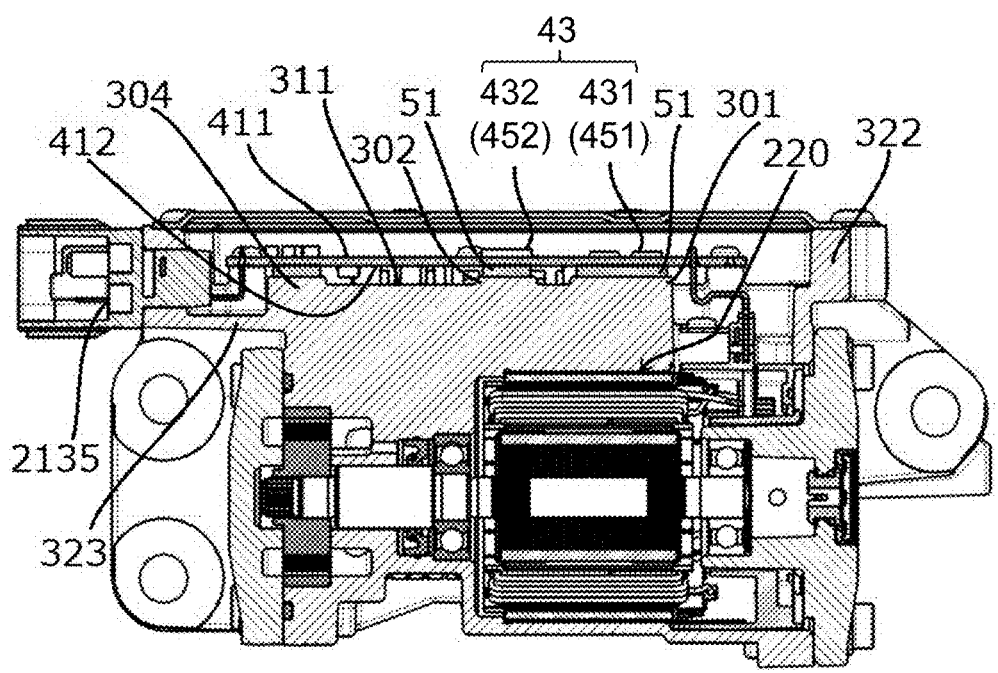
FIG. 4 is a sectional view of the electric pump along a first coupling part.

In the present embodiment, the electric oil pump 200 includes a connector part 2135 extending in the axial direction from the front side of the substrate housing 213. The connector part 2135 is a location where connection is established between the outside and the electric oil pump 200. The connector part 2135 includes a terminal for connection of the end of the circuit substrate 40 on the front side in the axial direction to the power source input part 454, which is illustrated in FIG. 1, as illustrated in FIGS. 4 and 6. The location where external connection is accepted in the connector part 2135 is between the substrate housing 213 and the side of the motor housing 211 and the pump housing 212. In other words, the connector part 2135 is located between the substrate 213 and the side of the motor housing 211 and the pump housing 212 in the Z direction. With this configuration, it is possible to achieve size reduction in the radial direction as compared with a case in which the connector part 2135 is disposed in a direction away from the substrate housing 213 relative to the motor housing 211 and the pump housing 212 in the Z direction.

The housing 210 includes the partition wall part 330 between the motor housing 211 that is the motor accommodation part and the substrate housing 213 that is the circuit substrate accommodation part. The partition wall part 330 separates the motor housing 211 from the substrate housing 213 and is in contact with an outer circumference of the stator 23 of the motor 220. The partition wall part 330 has a thickness in a direction away from the stator 23, and the surface on the opposite side that comes into contact with the stator 23 is located inside the substrate housing. The partition wall part 330 extends from the stator 23 to the side of the pump housing 212. A portion of the partition wall part 330 does not extend on the rear side, and a region of the second through-hole 210b for connecting the third accommodation recessed part 213a to the first accommodation recessed part 211a is defined. The partition wall part 330 has an arc sectional shape along the stator 23 when seen from the axial direction.

The housing 210 includes the projecting part 300 that projects from the partition wall part 330 to the side of the circuit substrate 40. The projecting part 300 is located between the stator 23 of the motor 220 and the heat generating component 43 of the circuit substrate 40 in an overlapping manner in the radial direction.

When the circuit substrate 40 is assembled with the second surface 412 directed to the side of the projecting part 300, it is in contact with the stator 23 of the motor 220, the projecting part 300 (including the partition wall part 330), the heat dissipating member 51, the circuit substrate 40, and the heat generating component 43 in this order when seen from the center axis J to the outer side in the radial direction.

The projecting part 300 has, for example, a table shape and has substantially a rectangular shape when seen from the side of the opening (−Z direction) of the substrate housing 213. An end of the projecting part 300 on the side of the circuit substrate 40 has a plane shape along the second surface 412 of the circuit substrate 40.

The projecting part 300 includes a first projecting part 301 projecting on the rear side of the motor 220 and a second projecting part 302 projecting on the front side of the motor 220. The first projecting part 301 and the second projecting part 302 extend in the axial direction and are disposed within the range of the motor in the axial direction. For example, the first projecting part 301 is located on the rear side of the motor 220 such that it overlaps the motor 220 and a transistor 431 that is a heat generating component. For example, the second projecting part 302 is located on the front side of the motor 220 such that it overlaps the motor 220 and a microcomputer 432 that is a heat generating component.

The first projecting part 301 has an oblong shape with a long side in the axial direction, for example, and has a shape extending in the axial direction. The second projecting part 302 has substantially a square shape, for example.

The substrate housing 213 that is the circuit substrate accommodation part of the housing 210 includes a wall part 320 that covers the surroundings of the circuit substrate 40. The wall part 320 includes surfaces in a direction that intersects the pate surfaces of the circuit substrate 40 and in a direction along the plate surfaces. Wall parts 321 and 322 that intersect the plate surfaces of the circuit substrate 40 stand in the −Z direction to surround the periphery of the thickness of the circuit substrate 40. A wall part 323 along the plate surfaces of the circuit substrate 40 extends on the front side in the axial direction such that it faces the plate surfaces, for example. The outer side of the wall part 320 is the outside of the electric oil pump 200, and the wall part seen from the outside includes an outer surface. In other words, the wall part 320 faces the inside of the substrate housing 213 that is the circuit substrate accommodation part and the outside of the electric oil pump 200.

The wall part 320 of the substrate housing 213 includes wall parts 321, which have surfaces along the axial direction, at two locations and wall parts 322, which intersect the axial direction, at two locations.

The wall part 320 of the substrate housing 213 includes the wall parts 322 connected to a corner (end portion) and a corner (end portion) of the wall parts 321 that have surfaces along the axial direction. The wall part 320 of the substrate housing 213 includes the wall parts 321 connected to a corner (end portion) and a corner (end portion) of the wall parts 322 that intersect the axial direction.

The projecting part 300 includes third projecting parts 303 between the first projecting part 301 and the wall part 320. The third projecting parts 303 are located in the direction (Y-axis direction) that intersects the axial direction from the first projecting part 301, for example. The third projecting parts 303 are present between the first projecting part 301 and the wall part 320 and projects from the partition wall part 330. The shape of the third projecting parts 303 is a table shape and is substantially a rectangular shape when seen from the side of the opening (−Z direction) of the substrate housing 213 similarly to the first projecting part 301. In a case in which it is assumed that the projecting parts 300 have the height of the projecting part 300 in the direction from the partition wall part 330 to the side of the circuit substrate 40 (−Z direction), ends of the third projecting parts 303 on the side of the circuit substrate 40 are located at the same height of an end of the first projecting part 301 on the side of the circuit substrate 40, for example.

The partition wall part 330 has an arc shape around the center axis J in a section seen from the axial direction. The outer side (wall part side) of the partition wall part in the section seen from the axial direction is located at a lower position in the height direction of the projecting part 300 toward the partition wall part 330. In the present embodiment, the first projecting part 301 projects from the center of the partition wall part 330 in the section seen from the axial direction, and the third projecting part 303 projects from a portion of the partition wall part 330 between the first projecting part 301 and the wall part 320 in the section seen from the axial direction. With this configuration, the height of the third projecting parts 303 is higher than the height of the first projecting part 301. Since the first projecting part 301 and the third projecting parts 303 have similar outer shapes, the third projecting parts 303 have a larger volume corresponding to the higher height than that of the first projecting part 301.

In the present embodiment, the first projecting part 301 is located at the center of the partition wall part 330 in a section seen from the axial direction. Also, the third projecting parts 303 are located on the left and right sides of the first projecting part 301 one by one in the section seen from the axial direction. Each of the first projecting part 301 and the third projecting parts 303 has a substantially rectangular shape when seen from the side of the opening (−Z direction) of the substrate housing 213 and also has the same length extending in the axial direction.

The projecting part 300 further includes a fourth projecting part 304 projecting from the wall part 323 on the front side. The fourth projecting part 304 overlaps the pump mechanism 30 in the radial direction when seen from the side of the opening (−Z direction) of the substrate housing 213. With this configuration, it is possible to transmit the heat transmitted to the fourth projecting part 304 to the fluid suctioned and ejected by the pump mechanism 30. Therefore, it is possible to dissipate, to the fluid, the heat of the heat generating component 43 (the transistor 431 used in the circuit (not illustrated) for preventing a reverse connection) transmitted to the third coupling part 313.

The housing 210 includes a coupling part 310 that couples the projecting part 300 to the wall part 320. The coupling part 310 connects the projecting part 300 to the wall part 320. In the present embodiment, the coupling part 310 has a plate shape projecting from the partition wall part 330 to the side of the circuit substrate 40 and having a surface in a direction intersecting or following the axial direction. The coupling part 310 may not be connected to the partition wall part 330.

The coupling part 310 includes a first coupling part 311 extending in the axial direction and a second coupling part 312 extending in the direction intersecting the axial direction. In the present embodiment, the first coupling part 311 extends in the axial direction from the front side of the first projecting part 301 and couples the first projecting part 301 to the fourth projecting part 304. Also, the second projecting part 302 is located between the first projecting part 301 and the fourth projecting part 304 in the first coupling part 311. The second projecting part 302 is coupled and connected to the first projecting part 301 and the fourth projecting part 304 with the first coupling part 311.

In the present embodiment, the second coupling part 312 extends in the direction (Y-axis direction) that intersects the axial direction from the first projecting part 301 and couples the first projecting part 301 to the wall parts 321 including the surfaces along the axial direction. Also, the third projecting part 303 is located between the first projecting part 301 and the wall parts 321 including the surface along the axial direction in the second coupling part 312. The third projecting part 303 is coupled and connected to the first projecting part 301 and the wall parts 321 including the surfaces along the axial direction with the second coupling part 312. The second coupling part 312 couples the first projecting part 301 to the third projecting part 303 linearly from one of the wall parts 321 in the direction (Y-axis direction) that intersects the axial direction to the other wall part 321.

The coupling part 310 further includes a third coupling part 313 that extends in the direction that intersects the axial direction from the first coupling part 311 and is coupled to the wall part 320 and fourth coupling parts 314 that extend in the axial direction from the second coupling part 312 and are coupled to the wall part 320.

The third coupling part 313 extends in the direction that intersects the axial direction and couples the first coupling part 311 to the wall part 321 including the surface along the axial direction. The third coupling part 313 establishes linear coupling from one of the wall parts 321 including the surfaces along the axial direction to the other. In a case in which the length in the direction from the partition wall part 330 to the side of the circuit substrate 40 (−Z direction) seen from the axial direction is assumed to be a height, the third coupling part 313 has a stepped shape with a changing height.

The third coupling part 313 is located on the front side, for example. At least a portion of the third coupling part 313 overlaps the pump housing 212 in the radial direction when seen from the side of the opening (−Z direction) of the substrate housing 213. The housing 210 includes a flow path 31 through which the fluid suctioned and ejected by the pump mechanism 30 is caused to flow, and the outer wall of the flow path 31 is inside the third accommodation recessed part 213a of the substrate housing 213. At least a portion of the third coupling part 313 projects from the outer wall of the flow path 31. With this configuration, it is possible to transmit, to the outer wall of the flow path 31, the heat transmitted to the third coupling part 313. Since the fluid flows inside the flow path 31, it is possible to transmit the heat received by the external wall of the flow path 31 to the fluid flowing inside the flow path 31. In other words, it is possible to dissipate the heat of the heat generating component 43 that has been transmitted to the third coupling part 313 and the heat of the motor 220 to the fluid.

The fourth coupling parts 314 extend in the axial direction and couple the second coupling part 312 to the wall parts 322 including the surface that intersects the axial direction. The fourth coupling parts 314 establish linear coupling from one of the wall parts 322 including the surfaces that intersect the axial direction to the other (from the front side to the rear side). The fourth coupling parts 314 are located between the third projecting part 303 and the wall parts 321 including the surfaces along the axial direction and linearly extend on the front side and the rear side in the axial direction. Also, parts of the fourth coupling parts 314 are also coupled to the wall parts 321 (323) including the surfaces along the axial direction on the front side of the substrate housing 213.

The coupling part 310 further includes a fifth coupling part 315 that couples the second projecting part 302 to the wall parts 321 including the surfaces along the axial direction. The fifth coupling part 315 extends in the direction (Y-axis direction) that intersects the axial direction from the second projecting part 302 and couples one of the wall parts 321 including the surfaces along the axial direction to the other.

In the present embodiment, the substrate housing 213 that is the circuit substrate accommodation part of the housing 210 has a substantially rectangular shape when seen from the side of the opening (−Z direction) of the substrate housing 213 with a long side (first long side) in the axial direction and a short side (first short side) in the direction (Y-axis direction) that intersects the axial direction. The circuit substrate 40 has a rectangular shape with a long side (second long side) in the axial direction and a short side (second short side) in the direction (Y-axis direction) that intersects the axial direction. The circuit substrate 40 enters the substrate housing 213 from the opening of the substrate housing 213 and is secured from the side of the opening of the substrate housing 213 to the side of the motor 220, the pump mechanism 30, and the partition wall part 330 with a screw 2134. The substrate housing 213 includes a screw hole 2133 that fastens the screw 2134 for fixing the circuit substrate 40. In the present embodiment, the screw hole 2133 of the substrate housing 213 is defined in a tubular part 2132 projecting from the partition wall part 330 to the side of the opening of the substrate housing 213.

Figure 7:
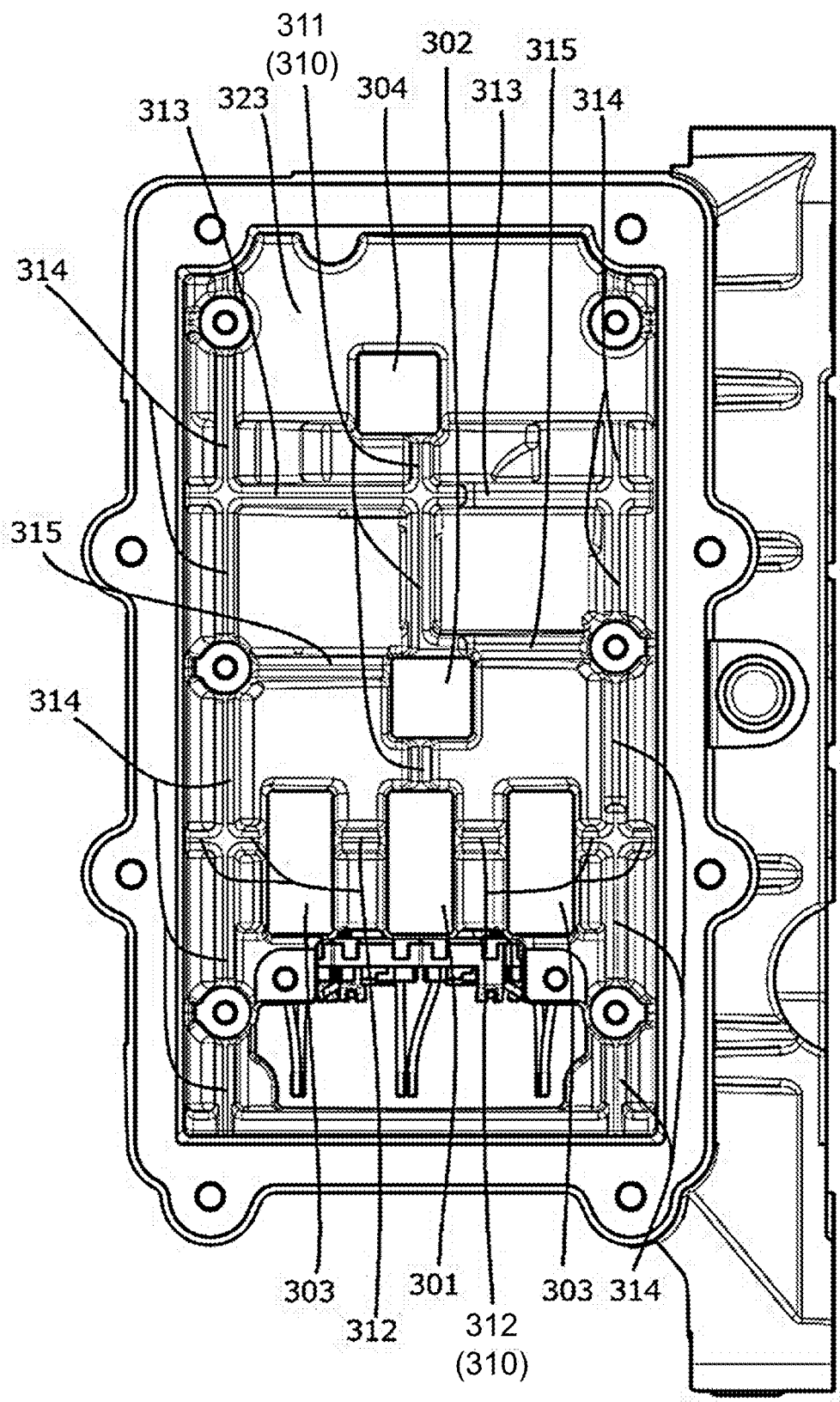
FIG. 7 is a diagram of the inside of the third accommodation recessed part when seen from a −side to a +side in a Z direction.

In the present embodiment, the first coupling part 311 to the fifth coupling part 315 have grid shapes when seen in the +Z direction from the side of the opening of the substrate housing 213. In a case in which the axial direction is defined as a longitudinal direction as illustrated in FIG. 7, the first coupling part 311 extends in the axial direction near the center and is coupled to the first projecting part 301 and the second projecting part 302 overlapping the motor 220 and the fifth projecting part 305 overlapping the pump mechanism 30, in the substrate housing 213 that is the circuit substrate accommodation part. The fourth coupling parts 314 extend in the axial direction between the third projecting part 303 and the wall part 320 and are coupled from one of the wall parts 322 including the surfaces that intersect the axial direction to the other. The second coupling part 312, the third coupling part 313, and the fifth coupling part 315 are coupled from one of the wall parts 321 including the surfaces along the axial direction to the other such that they interest the one first coupling part 311 and the two fourth coupling parts 314 extending in the axial direction. In regard to the distances of the first coupling part 311 and the second coupling part 312 from the first projecting part 301 and the second projecting part 302 to the wall part 320, the distance of the second coupling part 312 is shorter.

The tubular part 2132 is provided at the wall part 320, or at a midpoint of the first coupling part 311 to the fifth coupling part 315, or at a location where any of the first coupling part 311 to the fifth coupling part 315 intersect one another.

The projecting part 300 of the housing 210 overlaps the motor 220 and the heat generating component 43 of the circuit substrate 40 as described below. In other words, the second surface 412 of the circuit substrate 40 is in contact with the motor 220, the projecting part 300, the heat dissipating member 51, the circuit substrate 40, and the heat generating component 43 in this order from the center axis J to the outer side in the radial direction when the second surface 412 of the circuit substrate 40 is assembled with the substrate housing 213 with the second surface 412 directed to the motor 220 and the pump mechanism 30. Also, the motor 220, the projecting part 300, and the heat generating component 43 overlap one another in the radial direction (from the center axis J to the outer side in the radial direction) when seen in the section along the axial direction. Moreover, the motor 220, the projecting part 300, and the heat generating component 43 overlap one another in the radial direction (from the center axis J to the outer side in the radial direction) when seen in the section orthogonal to the axial direction. It is not necessary for the center portions of the motor 220, the projecting part 300, and the heat generating component 43 to overlap one another both when seen in the section along the axial direction and when seen in the section orthogonal to the axial direction, and it is only necessary for at least parts thereof to overlap each other even if the center portions conform to each other. With such a configuration, the projecting part 300 is able to receive the heat of the heat generating component 43 and the heat of the motor 220, and it is possible to dissipate the heat of the heat generating component 43 and the motor 220. The projecting part 300 that has received heat is able to dissipate heat to the outside from the side surface that is not in contact with the heat generating component 43. Since the projecting part 300 dissipates not only the heat of the heat generating component 43 but also the heat of the motor 220, excellent heat dissipation is achieved. It is possible to extend a time during which the motor 220 operates in a high output state, for example, due to excellent heat dissipation. Also, it is possible to achieve a high-output operation without leading to an increase in size of the body of the motor 220. In a case in which excellent heat dissipation is not achieved, there is a concern that the heat generating component 43 and the motor 220 may reach the specification upper limit temperatures and may be broken, for example.

Also, the circuit substrate 40 may be assembled with the substrate housing 213 with the first surface 411 directed to the motor 220 and the pump mechanism 30. In this case, the circuit substrate 40 overlaps and comes contact with the motor 220, the projecting part 300, and the heat generating component 43 in this order from the center axis J to the outer side in the radial direction in the section seen from the axial direction. The projecting part 300 comes into contact with the resin surface 435 of the heat generating component 43 facing the same direction as the first surface of the circuit substrate 40. Moreover, the heat dissipating member 51 may be sandwiched between the projecting part 300 and the heat generating component 43.

The material of the housing 210 may be metal or a resin. In a case in which the housing 210 is made of metal, it is possible to establish insulation between the circuit substrate 40 and the housing 210 by using the heat dissipating member 51 with a base material made of silicone, for example and sandwiching the heat dissipating member 51 between the second surface 412 of the circuit substrate 40 and the projecting part 300 of the housing 210. In a case in which the housing 210 is defined by resin, it is not necessary for the housing 210 to be defined as one member, and the housing 210 may be appropriately molded integrally with a member made of metal. The motor housing 211 and the substrate housing 213 may be defined by resin, the pump housing 212 may be made of metal, and the housing 210 may be defined through integral molding. Also, only the projecting part 300 may be made of metal or a resin.

The housing 210 includes the coupling part 310 that couples the projecting part 300 to the wall part 320. It is possible to dissipate heat that the projecting part 300 receives from the heat generating component 43 and the motor 220 to the wall part 320 via the coupling part 310 by including the coupling part 310. Since the wall part 320 includes an outer surface facing the outside of the housing 210, it is possible to dissipate heat transmitted from the coupling part 310 to the outside of the outer surface. In other words, it is possible to dissipate heat of the heat generating component 43 and the motor 220 from the electric oil pump 200 to the outside. Note that various kinds such as a counterpart member such as an attachment target, external gas (air, gas, or the like), oil (cooling oil, lubricant oil, grease), or another fluid may be outside the housing 210 (electric oil pump 200) depending on the attachment environment. The heat that has been transmitted to the wall part 320 is dissipated to the counterpart member, external gas, oil, another fluid, or the like, and it is possible to dissipate the heat of the heat generating component 43 and the motor 220 from the electric oil pump 200.

The housing 210 includes the partition wall part 330 that partitions the motor housing 211 that is the motor accommodation part and the substrate housing 213 that is the circuit substrate accommodation part. The partition wall part 330 is in contact with the outer circumference of the stator 23 of the motor 220. The partition wall part 330 is in contact over the entire axial direction of the motor 220. It is possible to receive heat of the motor 220 by the motor 220 over the entire axial direction and to achieve excellent heat dissipation by the projecting part 300 projecting from the partition wall part 330 and the coupling part 310 being coupled in the axial direction.

The coupling part 310 includes the first coupling part 311 that extends in the axial direction from the projecting part 300 and the second coupling part 312 that extends in the direction that intersects the axial direction from the projecting part 300. With this configuration, it is possible to transmit heat to a plurality of locations in the wall part 320. Since it is possible to transmit the heat to the plurality of locations in the wall part 320, excellent heat dissipation is achieved. Also, the heat of the motor 220 is dissipated not only to the projecting part 300 but also to the first coupling part 311, and further heat dissipation is achieved, by the first coupling part 311 extending in the axial direction overlapping the motor 220. Moreover, the heat of the motor 220 is also dissipated to the second coupling part 312, and further heat dissipation is able to be achieved by the second coupling part 312 overlapping the motor 220. The first coupling part 311 extending in the axial direction dissipates heat to the wall parts 322 including the surfaces that intersect the axial direction, and the second coupling part 312 extending in the direction that intersects the axial direction dissipates heat to the wall parts 321 including the surfaces along the axial direction. Therefore, it is possible to dissipate heat from the entire wall part 320 and to achieve excellent heat dissipation by the housing 210 including the first coupling part 311 and the second coupling part 312.

The projecting part 300 includes the first projecting part 301 projecting from the rear side of the partition wall part 330 and the second projecting part 302 projecting from the partition wall part 330 on the side further frontward than the first projecting part 301. Also, the circuit substrate 40 includes the motor power source output part 455 at the end on the rear side in the axial direction and includes the motor drive circuit 451 and the control part 452 in this order from the motor power source output part 455 to the front side. In the case of the present embodiment, the first projecting part 301 receives heat of the transistor 431 constituting the motor drive circuit 451, and the second projecting part 302 receives heat of the microcomputer 432 that controls power distribution to the motor drive circuit 451. The heat generating component 43 attached to the circuit substrate 40 is able to dissipate heat to each of the first projecting part 301 and the second projecting part 302, and excellent heat dissipation is achieved, by including the plurality of projecting parts 300.

As illustrated in FIG. 5, the first projecting part 301 and the second projecting part 302 are disposed side by side in the axial direction and overlap the motor 220. Since not only the first projecting part 301 but also the second projecting part 302 overlap the motor 220, the motor 220 is able to dissipate heat to the first projecting part 301 and the second projecting part 302, and excellent heat dissipation is achieved.

Figure 8:
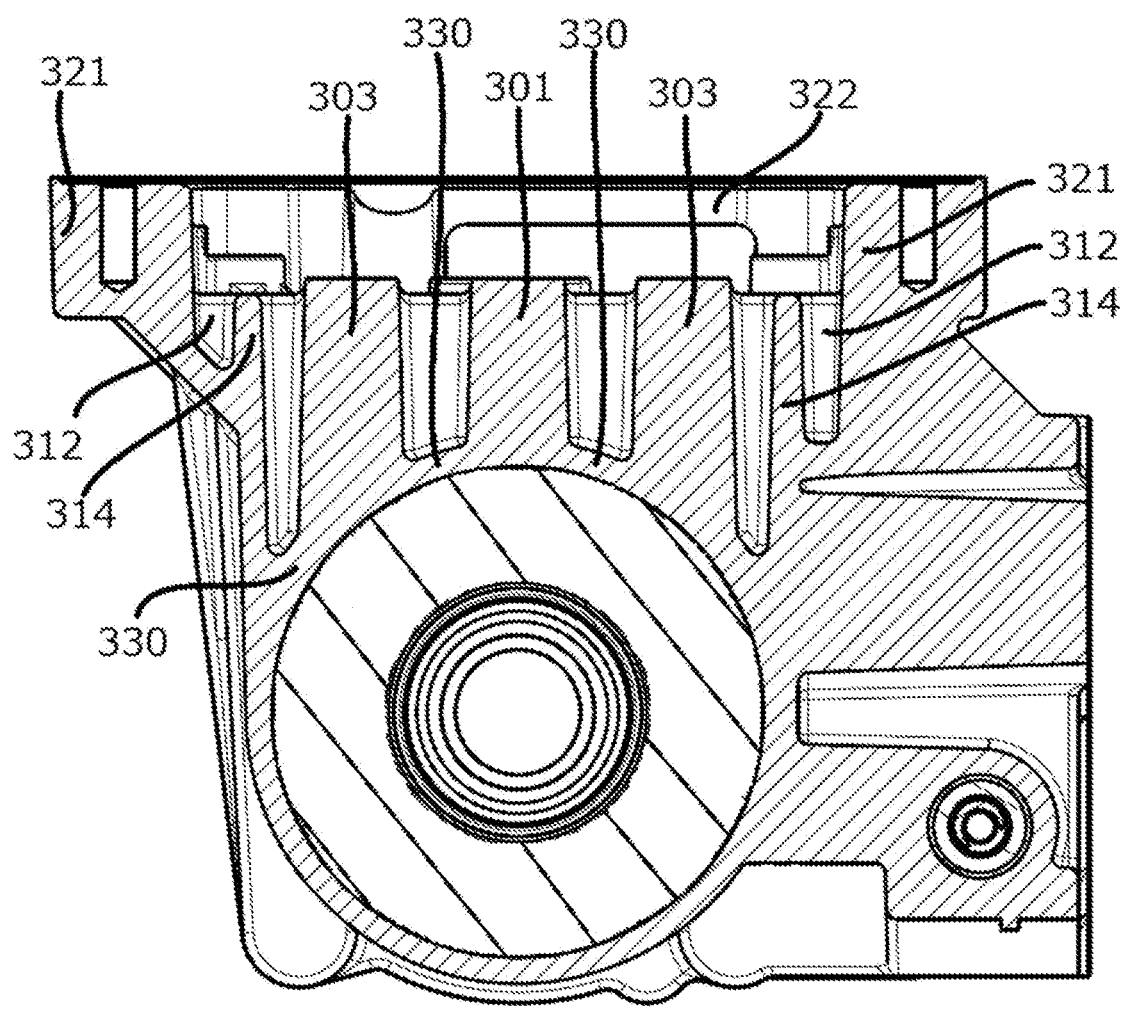
FIG. 8 is a sectional view of a section of a portion of the electric pump according to the present embodiment in a direction that intersects an axial direction on a side further rearward than a second coupling part.

The projecting part 300 further includes the third projecting part 303 between the first projecting part 301 and the wall part 320. As illustrated in FIG. 8, the third projecting part 303 projects from the partition wall part 330. The third projecting part 303 overlaps a portion of the transistor 431 constituting the motor drive circuit 451 and the motor 220. It is possible to further dissipate the heat of the heat generating component 43 and the heat of the motor 220 by including the third projecting part 303.

Figure 9:
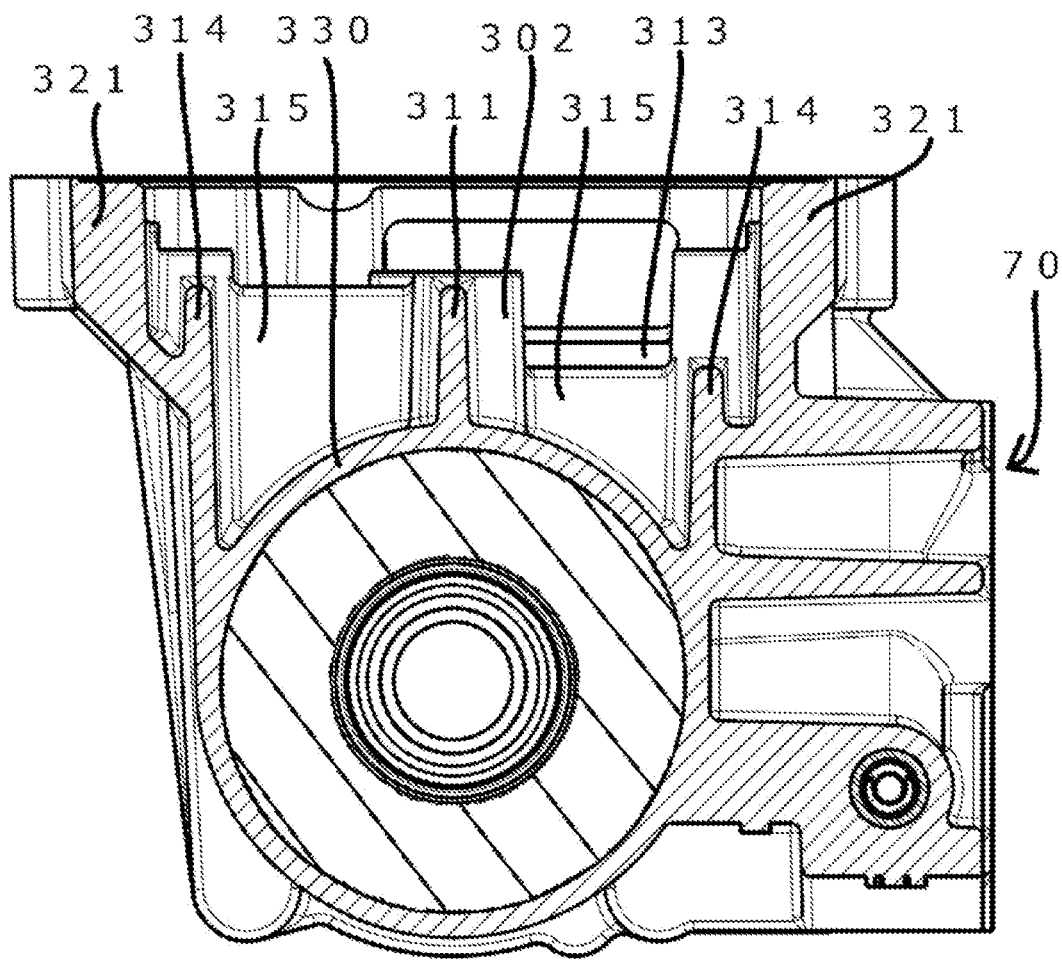
FIG. 9 is a sectional view of a section of a portion of the electric pump according to the present embodiment in a direction that intersects the axial direction on a side further frontward than the second coupling part.

Also, the first projecting part 301 projects from the center of the partition wall part 330 in the Y-axis direction to the side of the opening of the substrate housing 213 that is the circuit substrate accommodation part. The third projecting part 303 projects from the partition wall part 330 between the first projecting part 301 and the wall parts 321 including the surfaces along the axial direction. In other words, the third projecting part 303 deviates from the first projecting part 301 in the Y-axis direction and is located on the outer side of the substrate housing 213 beyond the first projecting part 301. As illustrated in FIGS. 8 and 9, the partition wall part 330 has an arc shape, and the outer side of the partition wall part 330 in the Y-axis direction is located at a lower position in the height direction of the projecting part 300 toward the wall part 320. The third projecting part 303 projecting from the partition wall part 330 with deviation to the side further outward than the first projecting part 301 in the Y-axis direction projects from the lower position than the first projecting part 301 and has an end on the side of the circuit substrate 40 up to the same height position as that of the first projecting part 301, and the third projecting part 303 thus has a larger volume than the first projecting part 301. With this configuration, it is possible to increase the volume of the third projecting part 303 and to further dissipate the heat of the heat generating component 43 and the heat of the motor 220.

Also, the third projecting part 303 is present between the first projecting part 301 and the wall parts 321 including the surfaces along the axial direction and is coupled to the second coupling part 312. Due to the coupling to the second coupling part 312, it is possible to dissipate the heat that the third projecting part 303 has received from the heat generating component 43 and the motor 220 to the wall parts 321 including the surfaces along the axial direction.

The third projecting part 303 is located between the first projecting part 301 and the wall parts 321 including the surfaces along the axial direction and is coupled to the first projecting part 301 and the wall parts 321 including the surfaces along the axial direction with the second coupling part 312. The second coupling part 312 between the third projecting part 303 and the wall parts 321 including the surfaces along the axial direction projects from the partition wall part 330 toward the side of the circuit substrate 40. The size of the projecting part 300 of the second coupling part in the height direction is larger between the third projecting part 303 and the wall parts 321 including the surfaces along the axial direction than between the first projecting part 301 and the third projecting part 303. Also, the distance of the second coupling part 312 in the Y-axis direction is longer between the third projecting part 303 and the wall parts 321 including the surfaces along the axial direction than between the first projecting part 301 and the third projecting part 303. The heat that the first projecting part 301 and the third projecting part 303 have received is transmitted through the second coupling part 312 and is then dissipated to the side of the wall parts 321 including the surfaces along the axial direction. The parts of the second coupling part 312 that is close to the wall parts 321 including the surfaces along the axial direction, that is, the second coupling part 312 between the third projecting part 303 and the wall parts 321 including the surfaces along the axial direction is larger than the parts between the first projecting part 301 and the third projecting part 303, a large surface area is obtained, and excellent heat dissipation is thus achieved. Also, in the section of the second coupling part 312 along a plane along the axial direction, the size of the sectional area between the third projecting part 303 and the wall parts 321 including the surfaces along the axial direction is larger. Due to the large sectional area, it is possible to further dissipate the heat to the wall parts 321 including the surfaces along the axial direction.

The coupling part 310 includes the third coupling part 313 that extends in the direction that intersects the axial direction from the first coupling part 311 and is connected to the wall parts 321 including the surfaces along the axial direction. The third coupling part 313 is able to receive heat that the first coupling part 311 has received and dissipate the heat to the wall parts 321 including the surfaces along the axial direction as well, and more excellent heat dissipation is achieved.

The coupling part 310 includes the fourth coupling part 314 that extends in the axial direction from the second coupling part 312 and is connected to the wall part 320. The fourth coupling part 314 is able to receive heat that the second coupling part 312 has received and dissipate the heat to the wall part 320 as well, and more excellent heat dissipation is achieved.

The coupling part 310 further includes the fifth coupling part 315 that couples the second projecting part 302 to the wall parts 321 including the surfaces along the axial direction. The fifth coupling part 315 is able to dissipate heat that the second projecting part 302 has received to the wall parts 321 including the surfaces along the axial direction.

The projecting part 300 may include the heat dissipating member 51 placed at the end on the side of the circuit substrate 40 and receive the heat of the heat generating component 43 via the heat dissipating member 51. Even in a case of the heat generating component 43 that is small relative to the end of the projecting part 300, it is possible to receive the heat by the entire end of the projecting part 300, and satisfactory heat dissipation for the heat generating component 43 is able to be achieved, by using the heat dissipating member 51. The heat dissipating member 51 may be provided at each projecting part 300, or one large heat dissipating member 51 may be placed and shared by all the first projecting part 301 to the third projecting part 303 concentrating on the rear side. Note that in a case in which the circuit substrate 40 is assembled with the second surface 412 directed to the side of the motor 220, it is possible to transmit heat from the heat generating component 43 to the heat dissipating member 51 via the substrate through-hole 413 (through-hole) in the circuit substrate 40.

The first coupling part 311 to the fifth coupling part 315 may be provided with stepped shapes. It is possible to dissipate the heat received from the projecting part 300 to the wall part 320 while avoiding interference with electronic components such as a capacitor mounted on the circuit substrate 40 by appropriately employing the stepped shape for each coupling part 310.

The third accommodation recessed part 213a of the substrate housing 213 may be filled with grease, a resin material, or a material containing silicone as a base material for connection from the projecting part 300 to the wall part 320. It is possible to dissipate the heat of the heat generating component 43 and the motor 220 from the electric oil pump 200 to the outside via not only the coupling part 310 but also the grease, the resin material, or the like used for the filling, through the filling with grease, a resin material, or the like.

In a case in which the circuit substrate 40 is assembled with the first surface 411 directed to the side of the projecting part 300, the first surface 411 may come into contact with the stator 23 of the motor 220, the partition wall part 330, the projecting part 300, and the heat generating component 43 in this order from the center axis J toward the outer side in the radial direction. The resin surface 435 of the heat generating component 43 directed to the same direction as that of the first surface 411 of the circuit substrate 40 may come into contact with the projecting part 300 and dissipate heat to the projecting part 300.

The housing 210 is in contact with the pump cover 212b that blocks the second accommodation recessed part 212a from the front side and the bearing holder 226 that blocks the first accommodation recessed part 211a from the rear side. Since the pump cover 212b and the bearing holder 226 are in contact with the housing 210, it is possible to transmit the heat of the heat generating component 43 and the motor 220 from the housing 210 (the projecting part 300 and the coupling part 310) to the pump cover 212b and the bearing holder 226, and further to dissipate the heat from the outer surfaces of the pump cover 212b and the bearing holder 226 to the outside. Excellent heat transmission is achieved, and more excellent heat dissipation is achieved by employing the pump cover 212b and the bearing holder 226 made of metal. Also, it is possible to further dissipate heat by employing the substrate cover 241 as a portion of the housing 210 made of metal. Also, the heat that the projecting part 300 and the coupling part 310 have received in the present embodiment is not dissipated only from the outer surface of the wall part 320 to the outside. In other words, since the substrate housing 213 including the wall part 320 is a portion of the housing 210, the heat that the projecting part 300 and the coupling part 310 have received is transmitted from the wall part 320 to the entire housing 210, and it is possible to dissipate the heat from the entire outer surface of the housing 210. It is possible to dissipate the heat from the entire outer surface of the housing 210 and thereby to achieve excellent heat dissipation.

Although the form in which the surfaces of the substrate follow the axial direction and the motor 220, the projecting part 300, and the heat generating component 43 overlap each other in the radial direction has been described in the present embodiment, the present disclosure is not limited thereto. The surfaces of the substrate may be disposed in a direction that intersects the axial direction, and a form in which the motor 220, the projecting part 300, and the heat generating component 43 overlap each other in the axial direction may be employed. In other words, a form in which the motor 220, the projecting part 300, and the heat generating component 43 overlap each other from one side in the axial direction to the other side in the axial direction when seen in the section along the axial direction and the motor 220, the projecting part 300, and the heat generating component 43 overlap each other in the axial direction when seen in a section orthogonal to the axial direction may be employed. In the form in which the motor 220, the projecting part 300, and the heat generating component 43 overlap each other in the axial direction, it is not necessary for the partition wall part 330 to have an arc shape, and the partition wall part 330 may have a recessed part or a hole.

Although the circuit substrate 40 is accommodated in the substrate housing 213 and the substrate housing 213 is provided with the projecting part 300 and the coupling part 310 in the present embodiment, the substrate cover 241 of the housing 210 may be defined into a box shape opening toward the side of the substrate housing 213 (+Z side), and the projecting part 300 and the coupling part 310 may also be provided inside the substrate cover 241. It is possible to further dissipate heat by providing the projecting part 300 and the coupling part 310 in the substrate cover 241 as well.

Each configuration (component) described in the aforementioned embodiment, modification examples, notes, and the like may be combined, and also, addition, omission, replacement, and other modifications of the configurations can be made, without departing from the gist of the present disclosure. Although the present embodiment employs the configuration in which the busbar unit 250 includes the joint busbar holder 252, a configuration in which the joint busbar holder 252 is not included may be employed. Although the present embodiment has illustrated the configuration in which the second long side (long side) of the circuit substrate 40 is disposed in the direction along the axial direction, the second short side (short side) of the circuit substrate 40 may be disposed in the direction along the axial direction. The circuit substrate 40 itself may be reduced in size by arranging the circuit configuration, and in the electric oil pump 200, the second long side (long side) of the circuit substrate 40 may intersect the axial direction to such an extent that it does not adversely affect an adjacent attachment target side such as a transmission, a body-related member, or the like of a vehicle. Also, even in a case in which the second short side (short side) of the circuit substrate 40 is disposed along the axial direction, size reduction in the radial direction may be achieved by providing a plurality of circuit substrates 40 and arranging the disposition of the plurality of circuit substrates 40. For example, the plurality of circuit substrate 40 may be disposed in the state in which the second short side (short side) follows the axial direction within the range in the case in which the second long side (long side) of one circuit substrate 40 is disposed along the axial direction, or the plurality of circuit substrates 40 may be disposed such that the plate surfaces overlap each other in a state in which the second short side (short side) follows the axial direction. Although the present embodiment illustrates the configuration in which the attachment plate part 70 includes the inlet port 731, the outlet port 734, and the flow path 73, a configuration in which the inlet port 731, the outlet port 734, and the flow path 73 are not included may be employed. For example, the circuit substrate 40 may be disposed on the side of the motor 220 such that the plate surfaces do not overlap the pump housing 212, and the inlet port 731, the outlet port 734, and the flow path 73 may be provided in the surroundings of the pump housing 212. Although the present embodiment illustrates the configuration in which the attachment plate part 70 includes an attachment hole, the attachment hole may be provided at another portion in the housing 210. The housing 210 is not limited to being composed of a single member. The housing 210 can also be composed of a plurality of housing parts.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric pump comprising:
   a motor comprising a shaft that is rotatable about a center axis;
   a pump mechanism coupled to one side of the shaft in an axial direction;
   a circuit substrate located outward in a radial direction orthogonal to the axial direction of the shaft; and
   a housing capable of accommodating the motor and the circuit substrate,
   wherein the circuit substrate comprises plate surfaces that are a first surface that faces the shaft, follows the axial direction, and comprises an electronic component and a second surface on a side opposite to the first surface,
   the housing comprises a motor housing part accommodating the motor, a substrate housing part accommodating the circuit substrate, a pump housing part accommodating the pump mechanism, and an attachment plate part located outward in the radial direction orthogonal to the axial direction of the shaft,
   the attachment plate part comprises an attachment surface that faces the shaft and follows the axial direction, and
   the motor and the pump mechanism are located on an inner angle side of an angle at which a third surface comprising the plate surfaces and a fourth surface comprising the attachment surface intersect each other,
   wherein the attachment plate part comprises at least two attachment holes,
   the at least two attachment holes comprise a first attachment hole and a second attachment hole, and
   the first attachment hole is located to be closer to one side in the axial direction than the pump housing part,
   wherein the attachment plate part comprises a flow path through which the fluid to be suctioned and ejected by the pump mechanism flows,
   wherein the flow path comprises an outlet flow path extending in the radial direction from the attachment surface and connected to the pump mechanism,
a first inlet flow path extending in the radial direction from the attachment surface to a side of the shaft,
a second inlet flow path connected to the first inlet flow path and passing inside the attachment plate part along the axial direction, and
a third inlet flow path connected to the second inlet flow path, extending in the radial direction, and connected to the pump mechanism, wherein
the third inlet flow path is present between the outlet flow path and the first inlet flow path in the axial direction when seen from a direction orthogonal to the fourth surface.

2. The electric pump according to claim 1, wherein the substrate housing part comprises a first long side that follows the axial direction and a first short side that intersects the first long side and follows the third surface.

3. The electric pump according to claim 1, wherein the circuit substrate comprises a second long side that follows the axial direction and a second short side that intersects the second long side and follows the third surface.

4. The electric pump according to claim 1,
wherein the attachment plate part has a thickness in the radial direction orthogonal to the axial direction of the shaft, and
the motor, the pump mechanism, and the attachment surface are disposed through the thickness.

5. The electric pump according to claim 1,
wherein the substrate housing part comprises a connector part for connection to outside, and
the connector part extends in the axial direction from the substrate housing part.

6. The electric pump according to claim 5, further comprising:
a plurality of busbars electrically connecting the motor to the circuit substrate,
wherein the plurality of busbars are connected to an end of the circuit substrate on the other side in the axial direction that is a side of the motor, and
the connector part extends from an end of the substrate housing part on the one side in the axial direction that is a side of the pump mechanism.

7. The electric pump according to claim 1,
wherein the second attachment hole is located to be closer to the other side in the axial direction than the motor housing part.

8. The electric pump according to claim 1, wherein at least one of the at least two attachment holes is present between an upper end and a lower end of the housing when seen from a direction orthogonal to the fourth surface.

9. The electric pump according to claim 1, wherein the attachment plate part comprises an inlet port adapted to suction a fluid using the pump mechanism and an outlet port adapted to eject the fluid using the pump mechanism.

10. The electric pump according to claim 9,
wherein the first attachment hole is located on the one side in the axial direction and the second attachment hole is located on the other side in the axial direction, and
the inlet port and the outlet port are located between the first attachment hole and the second attachment hole.

11. The electric pump according to claim 10,
wherein the attachment plate part comprises a third attachment hole, and
the inlet port and the outlet port are located between the third attachment hole and the first attachment hole or the second attachment hole when seen from the axial direction.

12. The electric pump according to claim 9,
wherein the attachment surface comprises
an inlet port surface part surrounding a periphery of the inlet port, and
an outlet port surface part surrounding a periphery of the outlet port.

13. The electric pump according to claim 9, wherein the inlet port is disposed with deviation in the axial direction from the outlet port when the attachment surface is seen from a direction orthogonal to the fourth surface.

14. The electric pump according to claim 1,
wherein the flow path comprises an inlet flow path and an outlet flow path extending in the radial direction from the attachment surface and connected to a side of the pump mechanism, and
the inlet flow path is present between the outlet flow path and the motor in the axial direction when seen from a direction orthogonal to the fourth surface.

15. The electric pump according to claim 1,
wherein the flow path comprises
an inlet flow path connected to a side of the pump mechanism from the inlet port,
an outlet flow path connected from the outlet port to the side of the pump mechanism, and
a relief flow path branching from the outlet flow path for returning the fluid to a side of the inlet flow path.

16. The electric pump according to claim 15, wherein at least a portion of the inlet flow path overlaps the relief flow path in a direction that intersects the axial direction when seen from a direction along the fourth surface.

17. The electric pump according to claim 1, wherein the attachment plate part is present between a lower end of the substrate housing part and upper ends of the motor housing part and the housing part when seen from a direction orthogonal to the fourth surface.

18. An electric pump comprising:
a motor comprising a shaft that is rotatable about a center axis;
a pump mechanism coupled to one side of the shaft in an axial direction;
a circuit substrate located outward in a radial direction orthogonal to the axial direction of the shaft; and
a housing capable of accommodating the motor and the circuit substrate,
wherein the circuit substrate comprises plate surfaces that are a first surface that faces the shaft, follows the axial direction, and comprises an electronic component and a second surface on a side opposite to the first surface,
the housing comprises a motor housing part accommodating the motor, a substrate housing part accommodating the circuit substrate, a pump housing part accommodating the pump mechanism, and an attachment plate part located outward in the radial direction orthogonal to the axial direction of the shaft,
the attachment plate part comprises an attachment surface that faces the shaft and follows the axial direction, and
the motor and the pump mechanism are located on an inner angle side of an angle at which a third surface comprising the plate surfaces and a fourth surface comprising the attachment surface intersect each other,
wherein the substrate housing part comprises a connector part for connection to outside, and the connector part extends in the axial direction from the substrate housing part along the third surface, wherein the attachment plate part comprises a flow path through which the fluid to be suctioned and ejected by the pump mechanism flows, wherein the flow path comprises
- an outlet flow path extending in the radial direction from the attachment surface and connected to the pump mechanism,
- a first inlet flow path extending in the radial direction from the attachment surface to a side of the shaft,
- a second inlet flow path connected to the first inlet flow path and passing inside the attachment plate part along the axial direction, and
- a third inlet flow path connected to the second inlet flow path, extending in the radial direction, and connected to the pump mechanism, wherein the third inlet flow path is present between the outlet flow path and the first inlet flow path in the axial direction when seen from a direction orthogonal to the fourth surface.

\* \* \* \* \*